US012526786B2

(12) United States Patent
Wang et al.

(10) Patent No.: US 12,526,786 B2
(45) Date of Patent: Jan. 13, 2026

(54) DYNAMIC SIDELINK POWER CONTROL

(71) Applicant: QUALCOMM Incorporated, San Diego, CA (US)

(72) Inventors: Hua Wang, Basking Ridge, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 620 days.

(21) Appl. No.: 18/067,453

(22) Filed: Dec. 16, 2022

(65) Prior Publication Data

US 2024/0205906 A1    Jun. 20, 2024

(51) Int. Cl.
*H04W 52/24*    (2009.01)
*H04W 52/38*    (2009.01)
*H04W 72/044*   (2023.01)
*H04W 72/23*    (2023.01)
*H04W 72/40*    (2023.01)

(52) U.S. Cl.
CPC ....... *H04W 72/0473* (2013.01); *H04W 72/23* (2023.01); *H04W 72/40* (2023.01)

(58) Field of Classification Search
None
See application file for complete search history.

(56) References Cited

U.S. PATENT DOCUMENTS

| | | | | |
|---|---|---|---|---|
| 2017/0238260 | A1* | 8/2017 | Kim | H04L 1/1819 |
| | | | | 455/522 |
| 2019/0173612 | A1* | 6/2019 | Kimura | H04L 1/0063 |
| 2020/0022089 | A1* | 1/2020 | Guo | H04W 52/242 |
| 2020/0322024 | A1* | 10/2020 | Cheng | H04W 76/11 |
| 2023/0081131 | A1* | 3/2023 | Selvanesan | H04W 72/20 |
| | | | | 370/329 |
| 2024/0214940 | A1* | 6/2024 | Zhang | H04W 52/0216 |

FOREIGN PATENT DOCUMENTS

| | | | | | |
|---|---|---|---|---|---|
| CN | 117480830 | A | * | 1/2024 | ............ H04W 8/24 |
| CN | 118120301 | A | * | 5/2024 | .......... H04W 52/383 |
| CN | 114450993 | B | * | 6/2025 | ............ H04W 72/53 |

* cited by examiner

*Primary Examiner* — Mohammed Rachedine
(74) *Attorney, Agent, or Firm* — Holland & Hart LLP

(57) ABSTRACT

Methods, systems, and devices for wireless communications are described. A first user equipment (UE) may receive control information from a network entity. The control information may indicate one or more sidelink resources allocated to the first UE for sidelink communications. The first UE may also receive an indication from the network entity that use of downlink power control parameters in determination of a sidelink transmission power for the sidelink communications may be disabled at the first UE. The first UE may transmit a sidelink message to a second UE using at least one sidelink resource of the one or more sidelink resources and with the sidelink transmission power determined at the first UE in accordance with the indication.

30 Claims, 17 Drawing Sheets

DYNAMIC SIDELINK POWER CONTROL

FIELD OF TECHNOLOGY

The following relates to wireless communications, including dynamic sidelink power control.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE). Some wireless communications systems may support techniques for sidelink power control. In some cases, existing techniques for sidelink power control may be deficient.

SUMMARY

The described techniques relate to improved methods, systems, devices, and apparatuses that support dynamic sidelink power control. For example, the described techniques provide a framework for dynamically enabling or disabling downlink power control parameters at a user equipment (UE). In some examples, a first UE may receive control information from a network entity. The control information may indicate one or more sidelink resources allocated to the first UE for sidelink communications. Additionally, the first UE may receive an indication from the network entity that use of downlink power control parameters in determination of a sidelink transmission power for the sidelink communications may be disabled at the first UE. In such examples, the first UE may transmit a sidelink message to a second UE using at least one sidelink resource of the one or more sidelink resources and with the sidelink transmission power determined at the first UE in accordance with the indication. For example, the first UE may transmit the sidelink message without the downlink power control parameters being used in the determination of the sidelink transmission power.

A method for wireless communication at a first UE is described. The method may include receiving, from a network entity, control information indicating one or more sidelink resources allocated to the first UE for sidelink communications, receiving, from the network entity, an indication that use of downlink power control parameters in determination of a sidelink transmission power for the sidelink communications is to be disabled at the first UE, and transmitting, to a second UE, a sidelink message using at least one sidelink resource of the one or more sidelink resources and with the sidelink transmission power determined at the first UE in accordance with the indication.

An apparatus for wireless communication at a first UE is described. The apparatus may include a processor, memory coupled with the processor, and instructions stored in the memory. The instructions may be executable by the processor to cause the apparatus to receive, from a network entity, control information indicating one or more sidelink resources allocated to the first UE for sidelink communications, receive, from the network entity, an indication that use of downlink power control parameters in determination of a sidelink transmission power for the sidelink communications is to be disabled at the first UE, and transmit, to a second UE, a sidelink message using at least one sidelink resource of the one or more sidelink resources and with the sidelink transmission power determined at the first UE in accordance with the indication.

Another apparatus for wireless communication at a first UE is described. The apparatus may include means for receiving, from a network entity, control information indicating one or more sidelink resources allocated to the first UE for sidelink communications, means for receiving, from the network entity, an indication that use of downlink power control parameters in determination of a sidelink transmission power for the sidelink communications is to be disabled at the first UE, and means for transmitting, to a second UE, a sidelink message using at least one sidelink resource of the one or more sidelink resources and with the sidelink transmission power determined at the first UE in accordance with the indication.

A non-transitory computer-readable medium storing code for wireless communication at a first UE is described. The code may include instructions executable by a processor to receive, from a network entity, control information indicating one or more sidelink resources allocated to the first UE for sidelink communications, receive, from the network entity, an indication that use of downlink power control parameters in determination of a sidelink transmission power for the sidelink communications is to be disabled at the first UE, and transmit, to a second UE, a sidelink message using at least one sidelink resource of the one or more sidelink resources and with the sidelink transmission power determined at the first UE in accordance with the indication.

A method for wireless communication at a network entity is described. The method may include outputting control information indicating one or more sidelink resources allocated to a first UE for sidelink communications and outputting an indication that use of downlink power control parameters in determination of a sidelink transmission power is to be disabled at the first UE for one or more sidelink communication between the first UE and at least a second UE.

An apparatus for wireless communication at a network entity is described. The apparatus may include a processor, memory coupled with the processor, and instructions stored in the memory. The instructions may be executable by the processor to cause the apparatus to output control information indicating one or more sidelink resources allocated to a first UE for sidelink communications and output an indication that use of downlink power control parameters in determination of a sidelink transmission power is to be disabled at the first UE for one or more sidelink communication between the first UE and at least a second UE.

Another apparatus for wireless communication at a network entity is described. The apparatus may include means for outputting control information indicating one or more sidelink resources allocated to a first UE for sidelink communications and means for outputting an indication that use of downlink power control parameters in determination of a sidelink transmission power is to be disabled at the first UE for one or more sidelink communication between the first UE and at least a second UE.

A non-transitory computer-readable medium storing code for wireless communication at a network entity is described. The code may include instructions executable by a processor to output control information indicating one or more sidelink resources allocated to a first UE for sidelink communications and output an indication that use of downlink power control parameters in determination of a sidelink transmission power is to be disabled at the first UE for one or more sidelink communication between the first UE and at least a second UE.

DETAILED DESCRIPTION

Figure 1:
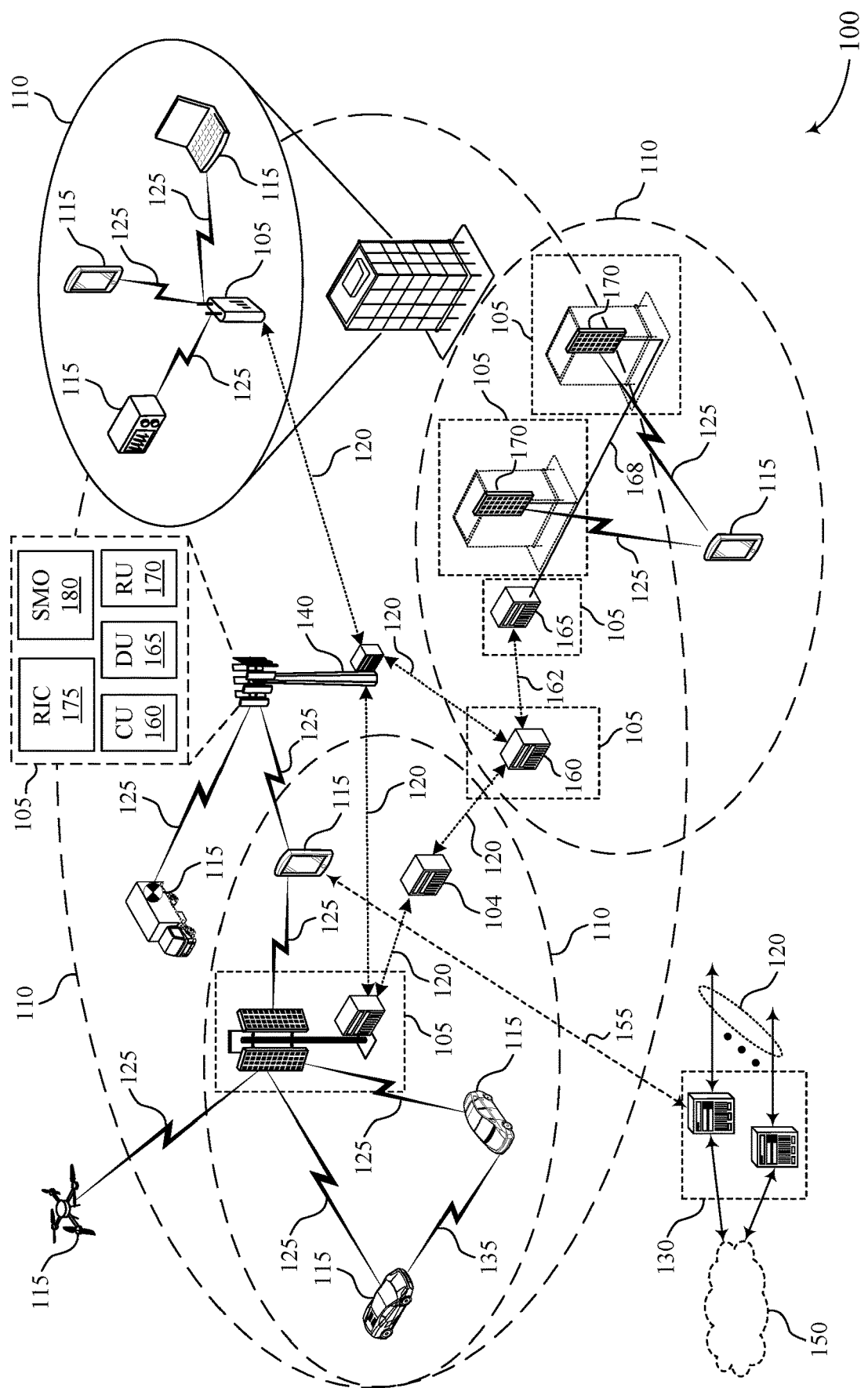
FIGS. 1 and 2 each illustrate an example of a wireless communications system that supports dynamic sidelink power control in accordance with one or more aspects of the present disclosure.

Some wireless communications systems may support one or more techniques for sidelink power control. For example, a wireless communications system may support a technique for sidelink power control in which a user equipment (UE) may be configured to determine a sidelink transmission power for sidelink communications based on one or more equations configured at the UE. In some examples, an equation used at the UE for determining the transmission power may include a downlink power component and a sidelink power component. In some examples, the downlink power component and the sidelink power control component may be based on one or more of the parameters indicated to the UE. For example, a network entity may indicate one or more downlink power control parameters to the UE for determination of the downlink power component of the sidelink transmission power for the sidelink communications. In some examples, the network entity may use the downlink power control parameters to reduce interference between sidelink transmissions and uplink transmissions. For example, the network entity may use the downlink power control parameters to constrain the sidelink transmit power and reduce interference between sidelink transmission and uplink transmission that may occur during a same duration (e.g., a symbol, a slot, or some other suitable duration).

In some examples, however, the wireless communications system may support a sidelink resource allocation mode (e.g., resource allocation mode 1) in which resources used for sidelink communications (e.g., between the UE and one or more other UEs) may be scheduled or configured by the network entity. In such examples, the network entity may schedule or configure the UE to transmit sidelink messages during resources that may be non-overlapping with resources allocated (e.g., designated) for uplink transmissions. For example, the network entity may schedule or configure the UE to transmit sidelink messages during symbols or slots allocated (e.g., designated) for downlink transmissions. In such an example, a likelihood of the sidelink transmissions interfering with uplink transmissions may be relatively low. Accordingly, the constraint on sidelink transmission power imposed by the downlink power control parameters may lead to an unnecessarily reduced sidelink transmission power.

In some examples, reducing the sidelink transmit power unnecessarily may lead to reduced throughput and decreased reliability of wireless communications. Accordingly, for instances in which interference between sidelink transmission and uplink transmissions may be unlikely, the network entity may determine to adjust values of the downlink control parameters, such that the constraint of the downlink power control parameters on the sidelink transmission power may be reduced (or removed). In some examples, however, such adjustments may be performed at the network entity via higher layer signaling, such as radio resource control (RRC) signaling, which may be semi-static. In such examples, a rate at which the network entity may update the downlink power control parameters using RRC signaling may be relatively slow compared to a rate at which the network entity may allocate resources to the UE for sidelink communications. As such, values of the downlink power control parameters indicated to the UE via RRC signaling may become outdated relatively quickly and degrade a performance of the UE.

Various aspects of the present disclosure generally relate to techniques for dynamic sidelink power control, and more specifically, to a framework for dynamically enabling or disabling downlink power control parameters at a UE. For example, a network entity may allocate one or more sidelink resources to the UE for sidelink communications. In some examples, the network entity may determine that the one or more sidelink resources may be non-overlapping with resources designated for uplink communications. For example, the network entity may determine that the one or more sidelink resources may be overlapping with resources designated for downlink communications. In such examples, the network entity may transmit an indication to the UE that use of downlink power control parameters in determination of a sidelink transmission power for the sidelink communications (e.g., using the one or more sidelink resources) may be disabled at the UE.

In some examples, the network entity may use a medium access control (MAC) control element (CE) to transmit the indication to the UE. In such an example, the MAC CE may include a field, such as a destination index field, whose content may be indicative of the indication. For example, the destination index field may include a destination index that may indicate, to the UE, to disable use of the downlink control parameters for sidelink transmissions to one or more UEs identified by the destination index. In some other examples, the network entity may use a downlink control information (DCI) message to transmit the indication to the UE. In such examples, the DCI message may include one or more bits that indicate that use of the downlink power control parameters in the determination of the sidelink transmission power for the sidelink communications using the one or more of the sidelink resources may be disabled at the UE. For example, the DCI message may include a respective bit for each of the one or more sidelink resources allocated to the UE. In such an example, each respective bit may indicate whether the downlink power control parameters may be used at the UE for determination of the sidelink transmission power for a sidelink communication using the corresponding resource. Alternatively, the DCI message may include a single bit to indicate whether the downlink power control parameters may be used at the UE for determination of the sidelink transmission power for a sidelink communication using the one or more sidelink resources (e.g., any one of the one or more sidelink resources).

In other words, the UE may receive a grant for sidelink resources from the network entity, for example via Mode 1 sidelink resource allocation. Additionally, the UE may receive the MAC CE or the DCI that indicates, to the UE, to disable a downlink component of the sidelink power control. That is, an equation used at the UE to calculate the sidelink transmission power includes a component that is based on downlink power control (e.g., the downlink component, which includes the downlink power control parameters). In some examples, such as examples in which the granted sidelink resources are non-overlapping with the resources dedicated for uplink communications, the downlink component may unnecessarily reduce the sidelink transmission power. In such examples, the network entity may use the MAC CE or the DCI to indicate, to the UE, to exclude the downlink power control parameters from the equation, such that the UE may calculate the sidelink transmission power without regard to the downlink power control parameters. In some examples, the UE may transmit a sidelink message to another UE using at least one sidelink resource allocated to the UE via the grant. In such examples, the UE transmits the sidelink message with the sidelink transmission power calculated using the equation that excludes the downlink power control parameters.

Particular aspects of the subject matter described herein may be implemented to realize one or more of the following potential advantages. For example, the techniques employed by the described communication devices (e.g., the UE, the network entity) may provide benefits and enhancements to the operation of the communication devices, including sidelink power control. In some examples, operations performed by the described communication devices may provide improvements to the reliability of communications within a wireless communications system. In some examples, the operations performed by the described communication devices to improve communication reliability within the wireless communications system may include using a MAC CE or a DCI message to dynamically enable or disable use of downlink power control parameters at the UE. In some instances, operations performed by the described communication devices may also support increased throughput and higher data rates, among other benefits.

Aspects of the disclosure are initially described in the context of wireless communications systems and process flows. Aspects of the disclosure are further illustrated by and described with reference to apparatus diagrams, system diagrams, and flowcharts that relate to dynamic sidelink power control.

FIG. 1 illustrates an example of a wireless communications system 100 that supports dynamic sidelink power control in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support dynamic sidelink power control as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may support one or more techniques for adjusting downlink power control parameters used at a UE 115 using higher layer signaling, such as RRC signaling. In some examples, however, RRC signaling may be semi-static and a rate at which a network entity 105 may update the downlink power control parameters using RRC signaling may be relatively slow compared to a rate at which the network entity 105 may allocate resources to the UE 115 for sidelink communications. As such, values of the downlink power control parameters indicated to the UE 115 via RRC signaling may become outdated relatively quickly and degrade a performance of the UE 115.

In some other examples, the wireless communications system 100 may support a framework for dynamically enabling or disabling downlink power control parameters at the UE 115. For example, the UE 115 may receive control information from the network entity 105. The control information may indicate one or more sidelink resources allocated to the UE 115 for sidelink communications. Additionally, the UE 115 may receive an indication from the network entity 105 that use of downlink power control parameters in determination of a sidelink transmission power for the sidelink communications may be disabled at the UE 115. For example, the UE 115 may receive a MAC CE or a DCI message including the indication that use of downlink power control parameters in determination of a sidelink transmission power for the sidelink communications may be disabled at the UE 115. In such examples, the UE 115 may transmit a sidelink message to another UE 115 using at least one sidelink resource of the one or more sidelink resources and with the sidelink transmission power determined at the UE 115 in accordance with the indication. For example, the UE 115 may transmit the sidelink message without the downlink power control parameters being used in the determination of the sidelink transmission power. In some examples, disabling use of the downlink power control parameters at the UE 115 via the MAC CE or the DCI message may lead to increased throughput and higher data rates, among other possible benefits.

Figure 2:
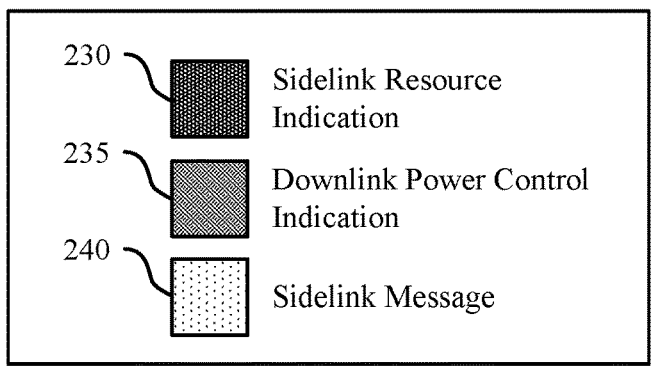
Figure 2:
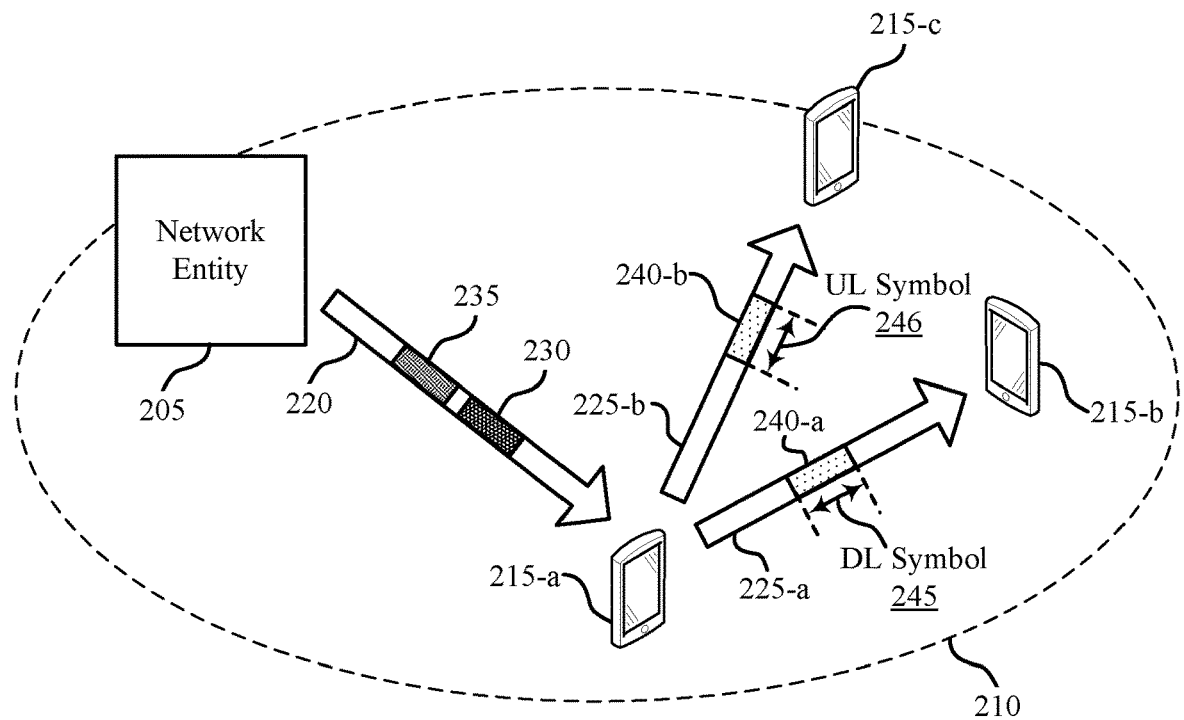

FIG. 2 illustrates an example of a wireless communications system 200 that supports dynamic sidelink power control in accordance with one or more aspects of the present disclosure. In some examples, the wireless communications system 200 may implement aspects of the wireless communications system 100. For example, the wireless communications system 200 may include a network entity 205, which may be an example of a network entity 105 described with reference to FIG. 1. The wireless communications system 200 may also include a UE 215-*a*, a UE 215-*b*, and a UE 215-*c*, which may be examples of a UE 115 described with reference to FIG. 1. The UEs 215 and the network entity 205 may communicate within a coverage area 210 which may be an example of a coverage area 110 described with reference to FIG. 1.

The UE 215-*a* may communicate with the UE 215-*b* via a communication link 225-*a*. Additionally, the UE 215-*a* may communicate with the UE 215-*c* via a communication link 225-*b*. In some examples, the communication links 225 may be examples of a communication link 135 as described with reference to FIG. 1. For example, the communication links 225 may be examples of sidelinks (e.g., a PC5 interface). In some examples, the UE 215-*b* and the UE 215-*c* may communicate via one or more other communication links, which may also be examples of the communication link 135 as described with reference to FIG. 1. The network entity 205 may communicate with the UE 215-*a* via a communication link 220, which may be an example of communication link 125 as described with reference to FIG. 1. For example, the communication link 220 may be an example of an access link (e.g., a Uu interface), such as a downlink. In some examples, the network entity 205 may communicate with the UE 215-*b* or the UE 215-*c*, or both, via one or more other communication links, which may also be examples of access links.

In some examples, the wireless communications system 200 may support one or more techniques for sidelink power control. For example, the wireless communications system 200 may support a technique for sidelink power control in which the UE 215-*a* (e.g., and one or both of the UE 215-*b* and the UE 215-*c*) may be configured to determine a transmission power for sidelink communications (e.g., a sidelink transmission power) based on one or more parameters. For example, the UE 215-*a* may use the one or more parameters to determine a transmission power for physical sidelinks shared channel (PSSCH) transmissions, physical sidelink control channel (PSCCH) transmissions, or physical sidelink feedback channel (PSFCH) transmissions. In some examples, the UE 215-*a* may be configured to use the one or more parameters to determine a transmission power (e.g., in units of decibel milliwatts (dBm)) for sidelink transmissions in accordance with one or more equations. In such examples, the one or more equations used at the UE 215-*a* for determining the transmission power may include a downlink power component and a sidelink power component. For example, the UE 215-*a* may be configured to determine a power ($P_{PSSCH}(i)$) for a PSSCH transmission during a transmission occasion (i) in accordance with the following Equation 1:

$$P_{PSSCH}(i) = \min(P_{CMAX}, P_{MAX,CBR}, \min(P_{PSSCH,D}(i), P_{PSSCH,SL}(i))) \text{ [dBm]} \quad (1)$$

in which $P_{CMAX}$ may correspond to a threshold output power (e.g., a maximum output power or an otherwise suitable output power) that may be used at the UE 215-*a*. A value associated with the threshold output power may be configured or otherwise determined at the UE 215-*a*. In some examples, $P_{MAX,CBR}$ may correspond to a threshold transmit power (e.g., a maximum transmit power) used at the UE 215-*a* for a measured channel busy ratio (CBR) level and a data transmission priority (e.g., under congestion control). For example, the UE 215-*a* may determine a value of the threshold transmit power ($P_{MAX,CBR}$) based on a value of a higher layer parameter that may be indicated via a sl-MaxTxPower field of a SL-PSSCH-TxConfigList information element (IE), a priority level of the PSSCH transmission, or a CBR range, or a combination thereof. In some examples, the parameter sl-MaxTxPower may be configured at the UE 215-*a* and the CBR range may include a CBR measured at the UE 215-*a* in a slot (e.g., a slot i-N in which N may correspond to a congestion control processing time). In some instances, such as examples in which the UE 215-*a* may not be provided the parameter sl-MaxTxPower, a value of the parameter $P_{MAX,CBR}$ may be equal to a value of the parameter $P_{CMAX}$. For example, if the parameter sl-MaxTxPower is not provided, the UE 215-*a* may determine the power ($P_{PSSCH}(i)$) for a PSSCH transmission during a transmission occasion (i) in accordance with the following Equation 2:

$$P_{PSSCH}(i) = \min(P_{CMAX}, \min(P_{PSSCH,D}(i), P_{PSSCH,SL}(i))) \text{ [dBm]}. \quad (2)$$

It is to be understood that the names of IEs and fields described herein may change based on implementation of one or more devices (e.g., the UEs 215, the network entity 205, or both), and the examples described herein should not be considered limiting to the scope covered by the claims or the disclosure.

In some examples, such as for in-coverage operations, a transmission power used for sidelink transmissions (e.g., the sidelink transmission power, a power spectral density) may be adjusted based on a pathloss from the network entity 205 (e.g., a gNB). For example, the parameter $P_{PSSCH,D}(i)$ may correspond to the downlink power component (e.g., a downlink part) of the sidelink transmission power and may be used at the UE 215-*a* for downlink pathloss-based power control. That is, the downlink power component may be based on a pathloss between the network entity 205 and the UE 215-*a*. For example, the UE 215-*a* may determine the downlink power component (e.g., the parameter $P_{PSSCH,D}(i)$) in accordance with the following Equation 3:

$$P_{PSSCH,D}(i) = P_{O,D} + 10\log_{10}(2^\mu \cdot M_{RB}^{PSSCH}(i)) + \alpha_D \cdot PL_D \text{ [dBm]} \quad (3)$$

in which $P_{O,D}$ may correspond to a power associated with the downlink pathloss-based power control for sidelink communications (e.g., PSSCH transmissions and PSSCH transmissions) and $\alpha_D$ may correspond to a compensation coefficient associated with the downlink pathloss-based power control for the sidelink communications. The parameter $P_{O,D}$ may, in some examples, be referred to as a physical downlink shared channel (PDSCH) transmission power. In some examples, the parameter $M_{RB}^{PSSCH}(i)$ may correspond to a quantity of resource blocks associated with the transmission occasion (i) and the parameter µ may correspond to a subcarrier spacing (SCS) configuration. In some instances, the parameter $PL_D$ may correspond to a downlink pathloss (e.g., the pathloss between the network entity 205 and the UE 215-*a*). For example, the parameter $PL_D$ may correspond to a downlink pathloss estimate (e.g., in dB or dBm) determined at the UE 215-*a* using a reference signal (e.g., transmitted from the network entity 205). In some examples, the UE 215-*a* may be configured to determine (e.g., calculate) the downlink pathloss using a framework that may be used to calculate a pathloss for uplink power control (e.g., physical uplink shared channel (PUSCH) power control). For example, the UE 215-*a* may be configured to transmit sidelink messages during symbols or slots allocated (e.g., designated) for uplink transmissions. In such an example, the sidelink transmission power may be determined such as to reduce interference between the sidelink transmissions and uplink transmissions (e.g., from other UEs, such as the UE 215-*b* or the UE 215-*c*). Accordingly, the UE 215-*a* may calculate the downlink pathloss for sidelink power control similarly to how the downlink pathloss may be calculated for uplink power control (e.g., Uu power control, PUSCH power control).

For example, to determine the downlink pathloss, the UE 215-*a* may be configured to monitor a downlink control channel (e.g., PDCCH) for detection of DCI (e.g., DCI format 0_0). In such an example, a reference signal used at the UE to determine the downlink pathloss (e.g., a downlink pathloss reference signal resource) may correspond to a reference signal (e.g., a reference signal resource) that the UE 215-*a* may use for determining a power of an uplink transmission (e.g., a PUSCH transmission) scheduled by the DCI (e.g., the DCI format 0_0, which may be received at the UE 215-*a* based on the monitoring). In some other examples, the UE 215-*a* may refrain from monitoring (e.g., may not be configured to monitor) the PDCCH for detection of DCI. In such examples, the downlink pathloss reference signal (e.g., the reference signal resource) may correspond to a synchronization signal/physical broadcast channel (SS/PBCH) block that the UE 215-*a* may use to obtain control information, such as a master information block (MIB).

In some examples, the transmission power used for sidelink communications (e.g., the sidelink transmission power, the power spectral density) may also be adjusted based on a pathloss between two communicating UEs (e.g., two of the UEs 215). For example, the parameter $P_{PSSCH,SL}(i)$ may correspond to the sidelink power component (e.g., a sidelink part) of the sidelink transmission power and may be used at the UE 215-*a* for sidelink pathloss-based power control. That is, the sidelink power component may be based on a pathloss between the UE 215-*a* and another UE (e.g., the UE 215-*b* or the UE 215-*c*). For example, the UE 215-*a* may determine the sidelink power component (e.g., the parameter $P_{PSSCH,SL}(i)$) in accordance with the following Equation 4:

$$P_{PSSCH,SL}(i) = P_{O,SL} + 10\log_{10}\left(2^\mu \cdot M_{RB}^{PSSCH}(i)\right) + \alpha_{SL} \cdot PL_{SL} \text{ [dBm]} \quad (4)$$

in which $P_{O,SL}$ may correspond to a power associated with the sidelink pathloss-based power control for sidelink communications (e.g., PSSCH transmissions and PSSCH transmissions) and $\alpha_{SL}$ may correspond to a compensation coefficient associated with the sidelink pathloss-based power control for the sidelink communications. In some instances, the parameter $PL_{SL}$ may correspond to a sidelink pathloss (e.g., the pathloss between the UE 215-*a* and the other UE). For example, the parameter $PL_{SI}$ may correspond to a sidelink pathloss estimate (e.g., in dB or dBm) determined at the UE 215-*a* based on a sidelink reference signal. In some examples, the UE 215-*a* may be configured to determine (e.g., calculate) the sidelink pathloss in accordance with the following Equation 5:

$$PL_{SL} = referenceSignalPower - \text{higher layer filtered } RSRP \quad (5)$$

in which refrenceSignalPower may correspond to a transmit power associated with the sidelink reference signal. For example, the UE 215-*a* may obtain the referenceSignal-Power parameter by summing a PSSCH transmit power (e.g., a power of the sidelink reference signal) per resource element over a quantity of antenna ports at the UE 215-*a*. In some examples, the summed PSSCH transmission power may be filtered (e.g., higher layer filtered) across one or multiple PSSCH transmission occasions using a filter configuration that may be provided to the UE 215-*a* via a sl-filterCoefficient parameter. For example, the network entity 205 may transmit higher layer signaling (e.g., RRC signaling) to the UE 215-*a* that includes a SL-ResourcePool IE, which may include a filter coefficient field (e.g., sl-FilterCoefficient). The filter coefficient field (e.g., the sl-FilterCoefficient parameter) may indicate a filtering coefficient, such as for long-term measurement and reference signal power derivation, that may be used at the UE 215-*a* for sidelink open-loop power control. In some examples, the higher layer filtered RSRP parameter may correspond to a reference signal received power (RSRP) that may be reported to the UE 215-*a* from another UE, such as a UE that may be receiving the sidelink reference signal (e.g., a sidelink transmission, a PSCCH-PSSCH transmission). That is, the UE 215-*a* may obtain the higher layer filtered RSRP parameter based on an RSRP reported from the other UE that may have receive the sidelink reference signal (e.g., a PSSCH demodulation reference signal (DM-RS)) and using a filter configuration that may be provided via the sl-filterCoefficient parameter.

In some examples, the UE 215-*a* may determine a transmission power for a PSFCH transmission (e.g., a PSFCH power) based on one or more downlink parameters. Additionally, the UE 215-*a* may determine a transmission power for a PSCCH transmission (e.g., a PSCCH power) based on the PSSCH power ($P_{PSSCH}(i)$) determined in accordance with Equation 1 or Equation 2. For example, the PSCCH power may correspond to a power scaled of the PSSCH power by a ratio of a quantity of resource blocks used for a PSCCH transmission to a quantity of resource blocks used for a PSSCH transmission. For instance, the UE 215-*a* may determine the PSCCH power ($P_{PSCCH,SL}(i)$) in accordance with the following equation 6:

$$P_{PSCCH}(i) = 10\log_{10}\left(\frac{M_{RB}^{PSCCH}(i)}{M_{RB}^{PSSCH}(i)}\right) + P_{PSSCH}(i)\text{[dBm]} \quad (6)$$

in which $M_{RB}^{PSCCH}(i)$ may correspond to the quantity of resource blocks for the PSCCH transmission in the transmission occasion (i).

In some examples, one or more of the parameters used to determine the downlink power component and the sidelink power component may be indicated to the UE 215-*a*. For example, the network entity 205 may indicate one or more parameters to the UE 215-*a* for sidelink power control via a SL-PowerControl IE. In some examples, the SL-PowerControl IE may be included in or otherwise indicated to the UE 215-*a* in accordance with a SL-ResourcePool IE. In some instances, the SL-PowerControl IE provided to the UE 215-*a* may include one or more fields that indicate respective values for one or more parameters to be used at the UE 215-*a* for sidelink power control. In some examples, the SL-PowerControl IE may include one or more fields for the sidelink power component and one or more other fields for the downlink power component. That is, the SL-PowerControl IE may include fields that indicate values for sidelink power control parameters to be used at the UE 215-*a* for determining the sidelink power component and other fields that indicate values for downlink power control parameters to be used at the UE 215-*a* for determining the downlink power component. For example, the SL-PowerControl IE may include a sl-P0-PSSCH-PSCCH field that indicates a value of the parameter $P_{O,SL}$ and a sl-Alpha-PSSCH-PSCCH field that indicates a value of the parameter $\alpha_{SL}$. In some examples, a value of sl-Alpha-PSSCH-PSCCH may not be provided to the UE 215-*a*. In such examples, the UE 215-*a* may determine to set $\alpha_{SL}$ to a value of "1." Additionally, the SL-PowerControl IE may include a dl-P0-PSSCH-PSCCH field that indicates a value of the parameter $P_{O,D}$ and a dl-Alpha-PSSCH-PSCCH field that indicates a value of the parameter $\alpha_D$. In some examples, a value of dl-Alpha-PSSCH-PSCCH may not be provided to the UE 215-*a*. In such examples, the UE 215-*a* may determine to set $\alpha_D$ to a value of "1." In some examples, the network entity 205 may use the sl-P0-PSSCH-PSCCH field and the sl-Alpha-PSSCH-PSCCH field to indicate (e.g., control, adjust) values for the sidelink power control parameters. Additionally, the network entity 205 may use the dl-P0-PSSCH-PSCCH field and the dl-Alpha-PSSCH-PSCCH field to indicate (e.g., control, adjust) values for downlink power control parameters.

In some examples, the network entity may use the downlink power control parameters (e.g., the dl-Alpha-PSSCH-PSCCH field and dl-P0-PSSCH-PSCCH field) to reduce (e.g., limit) interference between sidelink transmissions and uplink transmissions. That is, the network entity 205 may use the downlink power control parameters to constrain the sidelink transmit power and reduce interference between sidelink transmission and uplink transmission that may occur during a same symbol (or some other suitable duration, such as a same slot).

In some examples, however, the wireless communications system 200 may support a sidelink resource allocation mode (e.g., resource allocation mode 1) in which resources used for sidelink communications between the UEs 215 may be scheduled or configured by the network entity 205. In such examples, the network entity 205 may schedule or configure the UE 215-a to transmit sidelink messages during resources that may be non-overlapping with resources designated for uplink transmissions. For example, the network entity 205 may schedule or configure the UE 215-a to transmit sidelink messages during symbols or slots allocated (e.g., designated) for downlink transmissions. In such an example, a likelihood of the sidelink transmissions interfering with uplink transmissions may be relatively low. Accordingly, the constraint on sidelink transmission power imposed by the downlink power control parameters may lead to an unnecessarily reduced sidelink transmission power at the UE 215-a. That is, interference between sidelink and uplink transmissions may be unlikely (e.g., not an issue) for resource allocation mode 1 in which the network entity 205 may be capable of scheduling uplink transmissions in such a way to avoid using a same resource (e.g., a same symbol) as may be used for sidelink transmissions. For example, the network entity 205 may schedule sidelink transmissions during resources (e.g., symbols, slots) designated for downlink transmissions, such that interference between sidelink transmissions and uplink transmissions may be unlikely (e.g., there may be there may be no interference between from the sidelink transmissions to the uplink transmission).

In some examples, such as examples in which interference between sidelink transmission and uplink transmissions may be unlikely (e.g., not an issue), the downlink power control parameters may impose an unnecessary power constraint (e.g., limit, cap) to sidelink transmissions at the UE 215-a. In such examples, the network entity 205 may determine to adjust values of the downlink control parameters. For example, the network entity 205 may adjust the values of the downlink power control parameters (e.g., values of $P_{O,D}$ and $\alpha_D$ via the dl-P0-PSSCH-PSCCH field and the dl-Alpha-PSSCH-PSCCH field, respectively) for sidelink transmissions (e.g., PSSCH and PSCCH transmissions) to reduce an imposition of (e.g., effectively not impose) the downlink power component of the sidelink power control. That is, the network entity 205 may indicate relatively high values for the downlink power control parameters (e.g., the $P_{O,D}$ and $\alpha_D$ parameters), such that a value of the downlink power component (e.g., the parameter $P_{PSSCH,D}(i)$) may be increased relative to a value of the sidelink power component (e.g., the parameter $P_{PSSCH,SL}(i)$). In such an example, Equation 1 may be reduced to the following Equation 7:

$$P_{PSSCH}(i) = \min(P_{CMAX}, P_{MAX,CBR}, P_{PSSCH,SL}(i)) \text{ [dBm]} \quad (7)$$

In some examples, however, such adjustments may be performed at the network entity 205 via an RRC configuration. For example, the network entity 205 may use RRC signaling (e.g., the SL-PowerControl IE that may include the dl-P0-PSSCH-PSCCH field and the dl-Alpha-PSSCH-PSCCH field) to indicate values of the downlink power control parameters (e.g., the $P_{O,D}$ and $\alpha_D$ parameters) to the UE 215-a. In some examples, RRC signaling from the network entity 205 to the UE 215-a may be semi-static, whereas signaling used at the network entity 205 to allocate resources to the UE 215-a may be dynamic. For example, the network entity 205 may use a DCI message to allocate (e.g., schedule or configure) sidelink resources to the UE 215-a for sidelink communications. In such an example, the UE 215-a may receive the sidelink resource allocation relatively quickly compared to a rate at which the network entity 205 may update values of the downlink power control parameters. In other words, a rate at which the network entity 205 may change an RRC configuration at the UE 215-a may be relatively slow compared to a rate at which the network entity 205 may schedule or configure the UE 215-a with sidelink resources for sidelink communications. As such, values of the downlink power control parameters indicated to the UE 215-a via RRC signaling may become outdated relatively quickly and degrade a performance of the UE 215-a.

In some other examples, the network entity 205 and the UEs 215 may support a framework for dynamically enabling or disabling the downlink power control parameters (e.g., the downlink part of the sidelink power control, the downlink power component). For example, in accordance with techniques for dynamic sidelink power control, as described herein, the network entity 205 may use a DCI message or a MAC CE to enable or disable the downlink power control parameters used at the UEs 215 in determination of a sidelink transmission power for sidelink communications. As illustrated in the example of FIG. 2, the UE 215-a may receive control information from the network entity 205 that may include a sidelink resource indication 230. In some examples, the sidelink resource indication 230 may indicate one or more sidelink resources allocated to the UE 215-a for sidelink communications. For example, the sidelink resource indication 230 may identify a first one or more sidelink resources to be used at the UE 215-a for transmission of the sidelink message 240-a to the UE 215-b. As illustrated in the example of FIG. 2, the first one or more sidelink resources may overlap in the time domain with a downlink symbol (e.g., DL symbol 245). Additionally, the sidelink resource indication 230 may indicate a second one or more sidelink resources to be used at the UE 215-a for transmission of the sidelink message 240-b to the UE 215-c. As illustrated in the example of FIG. 2, the second one or more sidelink resources may overlap in the time domain with an uplink symbol (e.g., UL symbol 246).

In some examples, the sidelink resource indication 230 may correspond to a dynamic grant. For example, the network entity 205 may use a dynamic grant (e.g., a DCI format 3_0) to indicate sidelink resources to the UE 215-a for a sidelink transmission. Additionally, or alternatively, the network entity 205 may use grants of periodic sidelink resources configured semi-statically (e.g., via RRC signaling), which may be referred to as configured grants. That is, the network entity 205 may use a configured grant to allocate resources to the UE 215-a in sets, which may occur periodically. In some examples, the network entity 205 may allocate multiple configured grants to the UE 215-a, which may be each be associated with one or more sets of resources (e.g., one or more frequency domain resources and one or more time domain resources). In some examples, the network entity 205 may use multiple types of configured grants to allocate resources to the UE 215-a. For example, the network entity 205 may use a Type 1 configured grant, which may be utilized at the UE 215-a prior to (e.g., until) the network entity 205 may release the Type 1 configured grant (e.g., via RRC signaling). Additionally, or alternatively, the network entity 205 may use a Type 2 configured grant to allocate resources to the UE 215-a, which may be utilized at the UE 215-a in response to the Type 2 configured grant being activated. For example, the network entity 205 may transmit control information, such as a DCI message (e.g., a DCI format 3_0), activating the Type 2 configured grant (e.g., one or more resource sets associated with the Type 2 configured grant) at the UE 215-a. In such an example, the UE 215-a may utilize the Type 2 configured grant (e.g., the one or more resource sets associated with the Type 2 configured grant) in response to receiving the control information. In such examples, the sidelink resource indication 230 may correspond to a dynamic grant, a Type 1 configured grant, a Type 2 configured grant, or control information activating the Type 2 configured grant.

In some examples, the UE 215-a may receive a downlink power control indication 235. The downlink power control indication 235 may indicate that use of downlink power control parameters in determination of a sidelink transmission power for the sidelink communications may be disabled at the UE 215-a. For example, the UE 215-a may receive a MAC CE from the network entity 205 that disables use of the downlink power control parameters at the UE 215-a in determination of the sidelink transmission power for the sidelink communications. In some examples, the MAC CE may include a field, such as a destination index field, whose content may be indicative of the downlink power control indication 235. For example, content of the destination index field included in the MAC CE may include a destination index (e.g., a link-layer identity that identifies a device or a group of devices) that may indicate, to the UE 215-a, to disable use of the downlink control parameters for the sidelink transmissions to one or more UEs. For example, the network entity 205 may determine that the first one or more sidelink resources that may be used at the UE 215-a for transmission of the sidelink message 240-a overlap in the time domain with the DL symbol 245. In such an example, the destination index may identify the UE 215-b (e.g., explicitly or implicitly via a sidelink used for communications between the UE 215-a and the UE 215-b). Accordingly, the UE 215-a may transmit the sidelink message 240-a using the first one or more sidelink resource and with the sidelink transmission power determined at the UE 215-a in accordance with the downlink power control indication 235. For example, the UE 215-a may transmit the sidelink message 240-a with a transmission power determined in accordance with an equation that excludes (or renders ineffective) the downlink power component (e.g., parameter $P_{PSSCH,D}(i)$), such as Equation 7. Additionally, in such examples, the UE 215-a may transmit the sidelink message 240-b with a transmit power determined in accordance with Equation 1 or Equation 2.

In some other examples, the UE 215-a may receive a DCI message from the network entity 205 that disables use of the downlink power control parameters at the UE 215-a in determination of the sidelink transmission power for the sidelink communications. For example, the downlink power control indication 235 may correspond to one or more bits included in a DCI message (e.g., a same DCI message that may include the sidelink resource indication 230 or another DCI message). In such an example, the one or more bits may be associated with the one or more sidelink resources and may indicate that use of the downlink power control parameters in the determination of the sidelink transmission power for the sidelink communications using the one or more of the sidelink resources (e.g., indicated using the sidelink resource indication 230) may be disabled at the UE 215-a. For example, the downlink power control indication 235 may correspond to one or more bits associated with the first one or more sidelink resources allocated to the UE 215-a for transmission of the sidelink message 240-a to the UE 215-b. Accordingly, the UE 215-a may transmit the sidelink message 240-a using the first one or more sidelink resource and with the sidelink transmission power determined at the UE 215-a in accordance with the downlink power control indication 235. For example, the UE 215-a may transmit the sidelink message 240-a with a transmission power determined in accordance with an equation that excludes (or renders ineffective) the downlink power component (e.g., the parameter $P_{PSSCH,D}(i)$), such as Equation 7. Additionally, in such examples, the UE 215-a may transmit the sidelink message 240-b with a transmit power determined in accordance with Equation 1 or Equation 2. In some examples, using the downlink power control indication 235 to dynamically enable or disable downlink power control parameters at the UE 215-a may increase a reliability of wireless communications within the wireless communications system 200, among other possible benefits.

Figure 3:
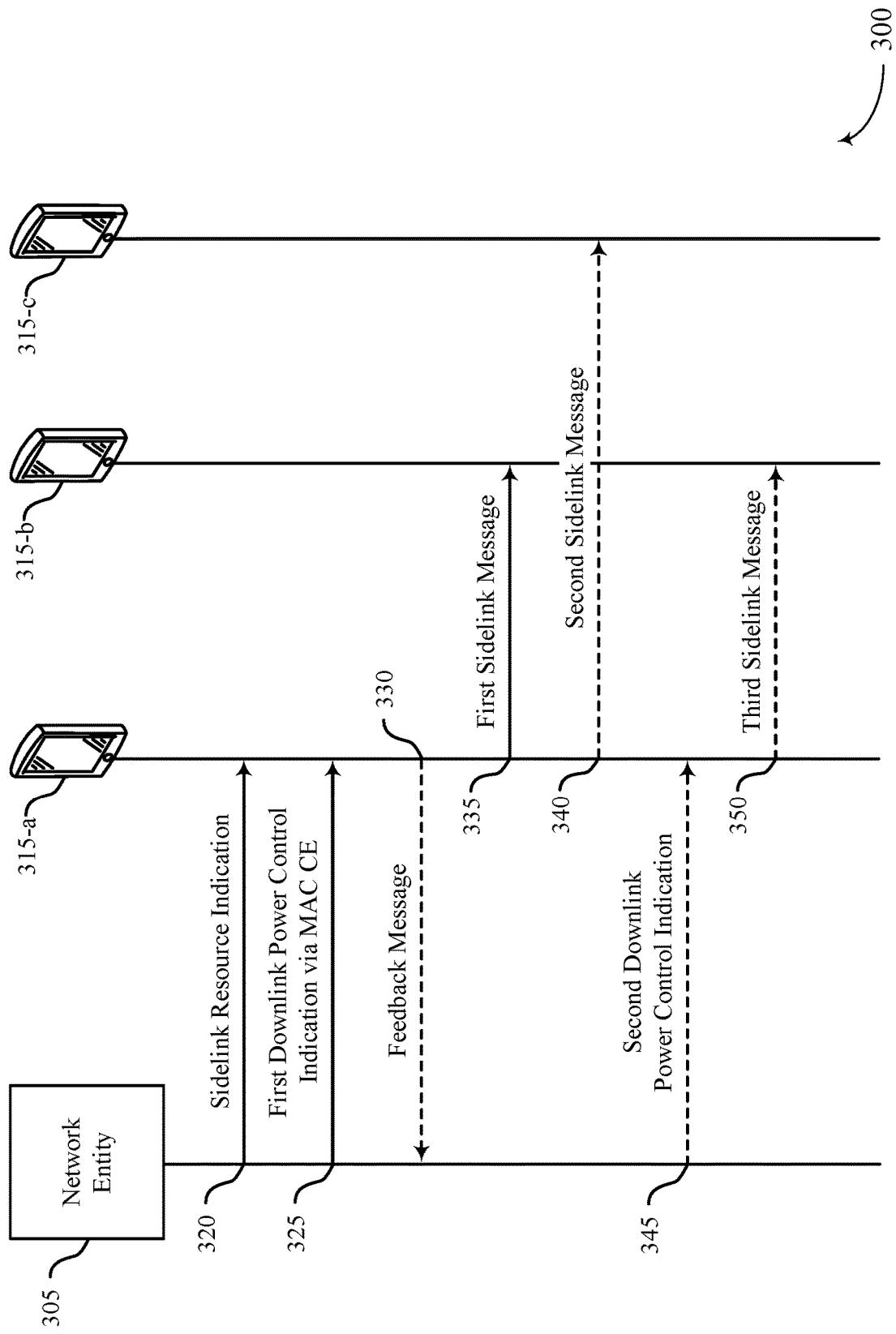
FIGS. 3 through 5 each illustrate an example of a process flow that supports dynamic sidelink power control in accordance with one or more aspects of the present disclosure.

FIG. 3 illustrates an example of a process flow 300 that supports dynamic sidelink power control in accordance with one or more aspects of the present disclosure. The process flow 300 may implement or be implemented to realize or facilitate aspects of the wireless communications system 100, the wireless communications system 200, or both. For example, the process flow 300 may include example operations associated a network entity 305, a UE 315-a, a UE 315-b, and a UE 315-c, which may be examples of the corresponding devices as described with reference to FIGS. 1 and 2. The operations performed at the network entity 305 or one or more of the UEs 315, or any combination thereof, may support improvements to communications between the network entity 305 and the UEs 315, among other benefits. In the following description of the process flow 300, the operations performed at the network entity 305 and the UEs 315 may occur in a different order than the example order shown. Additionally, the operations performed at the network entity 305 and the UEs 315 may be performed in different orders or at different times. Some operations may be combined and some operations may be omitted. In the example of FIG. 3, the network entity 305 and the UEs 315 may support a framework for dynamically enabling or disabling downlink power control parameters.

At 320, the UE 315-a may receive a sidelink resource indication from the network entity 305. In some examples, the sidelink resource indication may be an example of a sidelink resource indication as described with reference to FIG. 2. For example, the sidelink resource indication may correspond to control information that indicates one or more sidelink resources allocated to the UE 315-a for sidelink communications. In some examples, the sidelink resource indication may correspond to a dynamic grant (e.g., transmitted via a DCI format 3_0), a Type 1 configured grant (e.g., transmitted via RRC signaling), a Type 2 configured grant (e.g., transmitted via RRC signaling), or control information (e.g., transmitted via a DCI 3_0) activating a Type 2 configured grant.

At 325, the UE 315-a may receive a first downlink power control indication via a MAC CE. In some examples, the first power control indication may be an example of a downlink power control indication as described with reference to FIG. 2. For example, the first downlink power control indication may indicate that use of downlink power control parameters in determination of a sidelink transmission power for the sidelink communications may be disabled at the UE 315-*a*. For example, the network entity 305 may use (e.g., define) a MAC CE (e.g., a Uu MAC CE) that may be used to enable or disable the downlink power control parameters (e.g., the downlink part of the sidelink power control, the downlink power component).

In some examples, the MAC CE may include a destination index to enable or disable the downlink power control parameters at the UE 315-*a* for a subset of sidelinks configured at the UE 315-*a*. For example, the destination indicate may indicate one or more sidelinks the MAC CE may apply to. In some examples, the destination index may indicate the one or more sidelinks by identifying one or more device (e.g., one or both of the UE 315-*b* and the UE 315-*c*). In such examples, the UE 315-*a* may determine to apply the MAC CE to sidelink communications with the identified devices. That is, in some examples, the MAC CE may include a field (e.g., a destination index field) whose contents may be indicative of the first downlink power control indication. In such examples, if the MAC CE is received disabling the downlink power control parameters, a destination index included as the content of the field may indicate that one or more sidelink communications from the UE 315-*a* (e.g., to the devices identified via the destination index) may be transmitted without the downlink power control parameters being used in the determination of the sidelink transmission power. Alternatively, if the MAC CE is received enabling the downlink power control parameters, a destination index included as the content of the field may indicate that one or more sidelink communications from the UE 315-*a* (e.g., to the devices identified via the destination index) may be transmitted with the downlink power control parameters being used in the determination of the sidelink transmission power. In the example of FIG. 3, the MAC CE may be received at the UE 315-*a* disabling the downlink power control parameters and the destination index included as the content of the destination index field may identify the UE 315-*b* (e.g., explicitly or implicitly via a sidelink used for communications between the UE 315-*a* and the UE 315-*b*).

In some other examples, the MAC CE may not include a destination index. In such examples, the MAC CE may be used to enable or disable the downlink power control parameters (e.g., the downlink part of the sidelink power control, the downlink power component) at the UE 315-*a* for multiple (e.g., all) sidelinks configured at the UE 315-*a*. That is, in some examples, the content of the destination index field may include an absence of a destination index. In such examples, if the MAC CE is received disabling the downlink power control parameters, the absence may indicate that all sidelink communications from the UE 315-*a* (e.g., within a duration of time) may be transmitted without the downlink power control parameters being used in the determination of the sidelink transmission power. Alternatively, if the MAC CE is received enabling the downlink power control parameters, the absence may indicate that all sidelink communications from the UE 315-*a* (e.g., within a duration of time) may be transmitted with the downlink power control parameters being used in the determination of the sidelink transmission power.

In some examples, the MAC CE may include a default destination index. In such examples, the MAC CE may be used to enable or disable the downlink power control parameters at the UE 315-*a* for multiple (e.g., all) sidelinks configured at the UE 315-*a*. In some examples, if the MAC CE is received disabling the downlink power control parameters, a default destination index included as the content of the destination index field may indicate that all sidelink communications from the UE 315-*a* (e.g., within a duration of time) may be transmitted without the downlink power control parameters being used in the determination of the sidelink transmission power. Alternatively, if the MAC CE is received enabling the downlink power control parameters, a default destination index included as the content of the destination index field may indicate that all sidelink communications from the UE 315-*a* (e.g., within a duration of time) may be transmitted with the downlink power control parameters being used in the determination of the sidelink transmission power.

In some examples, at 330 the UE 315-*a* may transmit a feedback message to the network entity 305 in response to receiving the first downlink power control indication. In such examples, the UE 315-*a* may be configured to disable the use of the downlink power control parameters in the determination of the sidelink transmission power for the sidelink communications subsequent to transmitting the feedback message. For example, disabling of the downlink power control parameters may occur at the UE 315-*a* after a time period (e.g., a minimum time period or another suitable time period, such as 3 ms) that that may be triggered by the transmitting of the feedback message (e.g., at 330). That is, in some examples, the MAC CE may disable (or enable) the downlink power control parameters after a quantity of slots or symbols after the feedback message (e.g., an acknowledgment message) of the MAC CE may be received at the network entity 305. In such examples, based on the feedback message, the network entity 305 may determine whether the UE 315-*a* may apply the downlink power control parameters (e.g., after the time period) and may schedule sidelink or uplink transmission accordingly. For example, if the MAC CE is received disabling the downlink power control parameters and the feedback message indicates an acknowledgment, the network entity 305 may schedule sidelink transmissions and uplink transmissions during different slots or different symbols. In some other examples, if the MAC CE is received enabling the downlink power control parameters and the feedback message indicates an acknowledgment, the network entity 305 may schedule sidelink transmissions and uplink transmissions during a same slot or a same symbol. In the example of FIG. 3, the feedback message may indicate an acknowledgment.

At 335, the UE 315-*a* may transmit a first sidelink message to the UE 315-*b* using one or more of the sidelink resources indicated to the UE 315-*a* via the sidelink resource indication. In some examples, based on the destination index identifying the UE 315-*b*, the UE 315-*a* may transmit the first sidelink message with the sidelink transmission power determined at the UE 315-*a* in accordance with the first downlink power control indication. That is, the UE 315-*a* may transmit the first sidelink message without the downlink power control parameters being used in the determination of the sidelink transmission power. In such an example, transmission of the first sidelink message may occur during a symbol designated for downlink transmissions. For example, the network entity 305 may be triggered to designate a downlink transmission during the symbol based on the feedback message.

In some examples, at 340 and based on the UE 315-*c* being unidentified by the destination index, the UE 315-*a* may transmit a second sidelink message to the UE 315-*c* with the downlink power control parameters being used in the determination of the sidelink transmission power. In some examples, after (e.g., once) use of the downlink power control parameters is enabled or disabled by a MAC CE, the downlink power control parameters may continue to be enabled or disabled (e.g., may remain enabled or disabled) for multiple (e.g., all) subsequent sidelink transmissions. For example, the downlink power control parameters may continue to be enabled or disabled until the UE 315-*a* receives another enabling or disabling MAC CE. In some other examples, the downlink power control parameters may continue to be enabled or disabled until use of the downlink power control parameters is enabled or disabled by a DCI message (e.g., a DCI format 3_0), for example on one or more allocated sidelink resources.

For example, at 345, the UE 315-*a* may receive a second downlink power control indication from the network entity 305. In such an example, second downlink power control indication may indicate that use of the downlink power control parameters in the determination of the sidelink transmission power for the sidelink communications may be enabled at the UE 315-*a*. In some examples, application by the UE 315-*a* of the first downlink power control indication may continue until application, by the UE 315-*a*, of the second downlink power control indication. For example, the second downlink power control indication may be included in a MAC CE that enables the downlink power control parameters and includes a destination index (or an absence of a destination index) that identifies at least the UE 315-*b*. Alternatively, the second downlink power control indication may correspond to one or more bits included in a DCI message. For example, the UE 315-*a* may receive a DCI message that may allocate one or more sidelink resources to the UE 315-*a* for transmission of the third sidelink message. Additionally, the DCI message may include one or more bits (e.g., corresponding to the second downlink power control indication) associated with the one or more sidelink resources allocated to the UE 315-*a* for transmission of the third sidelink message. In such an example, the one or more bits may indicate use of the downlink power control parameters for transmission of the third sidelink message using the one or more sidelink resources may be enabled at the UE 315-*a*. In such examples, at 350, the UE 315-*a* may transmit the third sidelink message to the UE 315-*b* in accordance with the second downlink power control indication. For example, the UE 315-*a* may transmit the third sidelink message with the downlink power control parameters being used in the determination of the sidelink transmission power. In some examples, using the first downlink power control indication and the second downlink power control indication to dynamically disable and enable, respectively, downlink power control parameters at the UE 315-*a* may increase a reliability of sidelink communications between the UEs 315, among other possible benefits.

Figure 4:
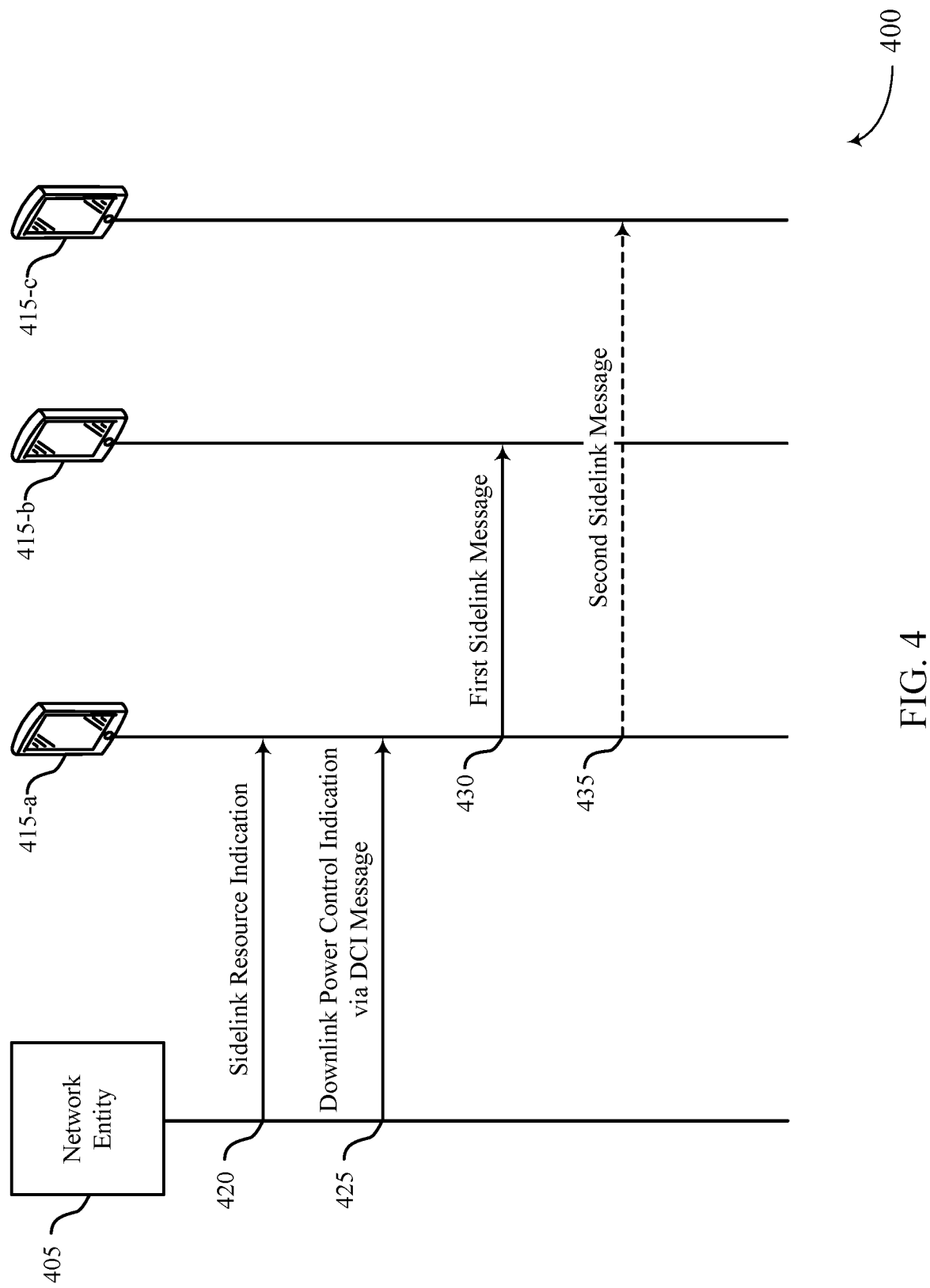

FIG. 4 illustrates an example of a process flow 400 that supports dynamic sidelink power control in accordance with one or more aspects of the present disclosure. The process flow 400 may implement or be implemented to realize or facilitate aspects of the wireless communications system 100, the wireless communications system 200, or the process flow 300, or any combination thereof. For example, the process flow 400 may include example operations associated a network entity 405, a UE 415-*a*, a UE 415-*b*, and a UE 415-*c*, which may be examples of the corresponding devices as described with reference to FIGS. 1 through 3. The operations performed at the network entity 405 or one or more of the UEs 415, or any combination thereof, may support improvements to communications between the network entity 405 and the UEs 415, among other benefits. In the following description of the process flow 400, the operations performed at the network entity 405 and the UEs 415 may occur in a different order than the example order shown. Additionally, the operations performed at the network entity 405 and the UEs 415 may be performed in different orders or at different times. Some operations may be combined and some operations may be omitted. In the example of FIG. 4, the network entity 405 and the UEs 415 may support a framework for dynamically enabling or disabling downlink power control parameters.

At 420, the UE 415-*a* may receive a sidelink resource indication from the network entity 405. In some examples, the sidelink resource indication may be an example of a sidelink resource indication as described with reference to FIG. 2. For example, the sidelink resource indication may correspond to control information that indicates one or more sidelink resources allocated to the UE 415-*a* for sidelink communications. In some examples, the sidelink resource indication may correspond to a dynamic grant (e.g., transmitted via a DCI format 3_0), a Type 1 configured grant (e.g., transmitted via RRC signaling), a Type 2 configured grant (e.g., transmitted via RRC signaling), or control information (e.g., transmitted via a DCI 3_0) activating a Type 2 configured grant.

At 425, the UE 415-*a* may receive a downlink power control indication via a DCI message. In some examples, the power control indication may be an example of a downlink power control indication as described with reference to FIG. 2. For example, the DCI message (e.g., a DCI format 3_0) may include control information allocating (or activating) one or more sidelink resources at the UE 415-*a* for transmission of one or more sidelink messages. In some examples, for each allocated sidelink resource, the DCI message may include one bit to indicate whether the UE 415-*a* may apply the downlink power control parameters (e.g., the downlink part of the sidelink power control, the downlink power component) for determination of a sidelink transmission power for sidelink communications using the allocated sidelink resource. That is, the DCI message may include one or more bits and each bit may correspond to a respective sidelink resource (e.g., of the one or more sidelink resources) and indicates that use of the downlink power control parameters in the determination of the sidelink transmission power for a sidelink communication using the respective sidelink resource may be disabled (or enabled) at the UE 415-*a*. In such an example, the downlink power control may be different for multiple (e.g., different) sidelink resources.

In some other examples, the DCI message may include one bit to indicate whether the UE 415-*a* may apply the downlink power control parameters for determination of a sidelink transmission power for sidelink communications using multiple (e.g., all) allocated sidelink resources (e.g., allocated using in the current DCI message). That is, the DCI message may include a bit that indicates that use of the downlink power control parameters in the determination of the sidelink transmission power for the sidelink communications using any of the one or more sidelink resources may be disabled (or enabled) at the UE 415-*a*. In some examples, the one or more bits may be set to "1" to indicate enable and "0" to indicate disable. In the example of FIG. 4, a first one or more bits included in the DCI message may correspond to a first one or more sidelink resources allocated to the UE 415-*a* for transmission of the first sidelink message and may indicate that use of the downlink power control parameters in the determination of the sidelink transmission power for the first sidelink message may be disabled at the UE 415-*a*. For example, the first one or more bits corresponding to the first one or more sidelink resources may be set to "0."

Additionally, a second one or more bits included in the DCI message may correspond to a second one or more sidelink resources allocated to the UE 415-*a* for transmission of the second sidelink message and may indicate that use of the downlink power control parameters in the determination of the sidelink transmission power for the second sidelink message may be enabled at the UE 415-*a*. For example, the second one or more bits may be set to "1." In such an example, the one or more sidelink resources indicated using the sidelink resource indication may include the first one or more sidelink resources and the second one or more sidelink resources. In some examples, the sidelink resource indication (e.g., received at 420) and the downlink power control parameter (e.g., received at 425) may be included in a same DCI message.

At 430, the UE 415-*a* may transmit the first sidelink message to the UE 415-*b* using the first one or more of the sidelink resources indicated to the UE 415-*a* via the sidelink resource indication. In some examples, the UE 415-*a* may transmit the first sidelink message with the sidelink transmission power determined at the UE 415-*a* in accordance with the downlink power control indication (e.g., the first one or more bits). That is, the UE 415-*a* may transmit the first sidelink message without the downlink power control parameters being used in the determination of the sidelink transmission power. In such an example, transmission of the first sidelink message may occur during a symbol designated for downlink transmissions.

In some examples, at 435, the UE 415-*a* may transmit the second sidelink message to the UE 415-*c* using the second one or more of the sidelink resources indicated to the UE 415-*a* via the sidelink resource indication. In some examples, the UE 415-*a* may transmit the second sidelink message with the sidelink transmission power determined at the UE 415-*a* in accordance with the downlink power control indication (e.g., the second one or more bits). That is, the UE 415-*a* may transmit the second sidelink message with the downlink power control parameters being used in the determination of the sidelink transmission power. In such an example, transmission of the first sidelink message may occur during a symbol designated for uplink transmissions. In some examples, using the downlink power control indication to dynamically disable and enable the downlink power control parameters at the UE 415-*a* for the first sidelink message and the second sidelink message, respectively, may increase a reliability of wireless communications between the UEs 415, among other possible benefits.

Figure 5:
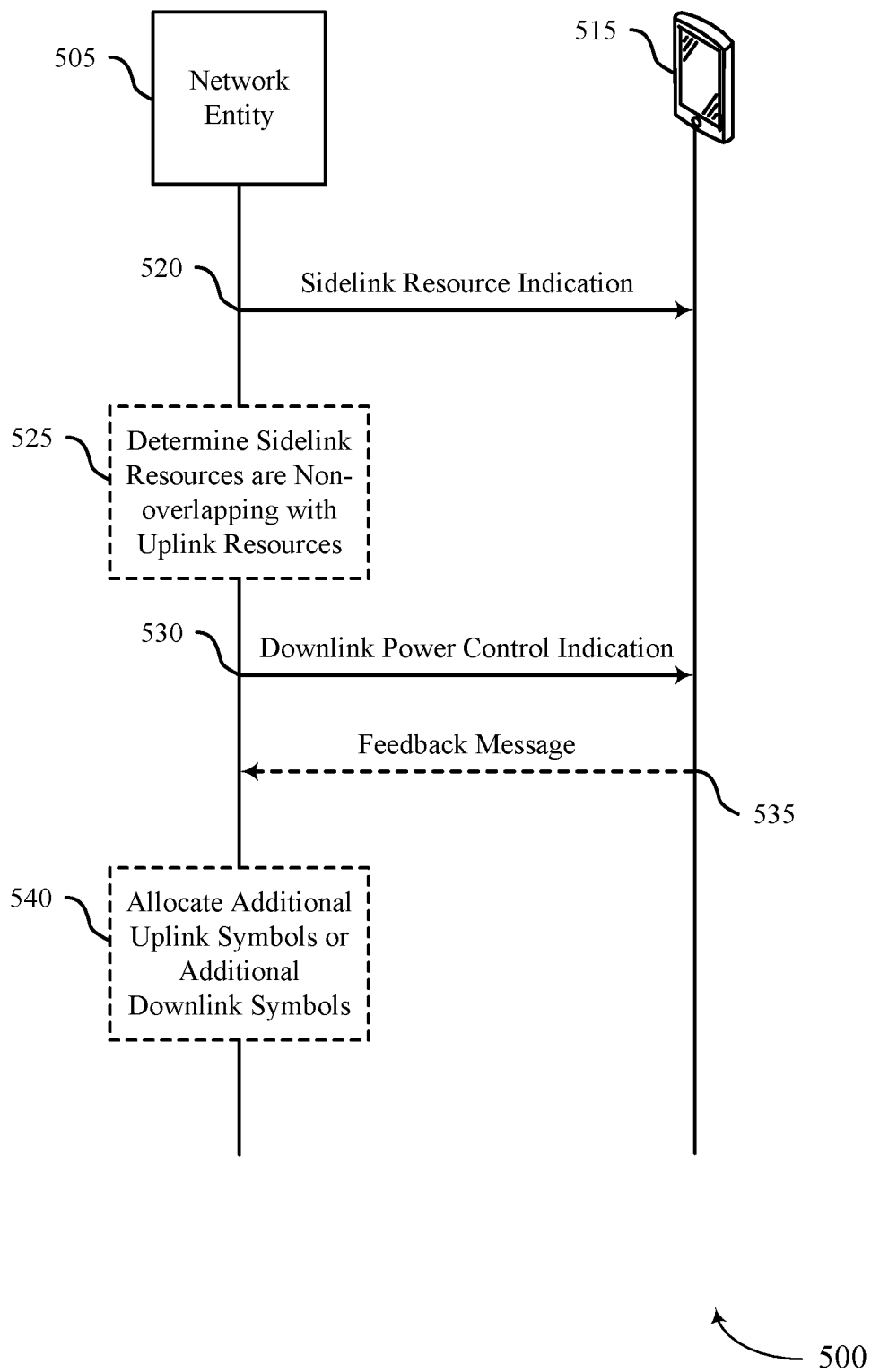

FIG. 5 illustrates an example of a process flow 500 that supports dynamic sidelink power control in accordance with one or more aspects of the present disclosure. The process flow 500 may implement or be implemented to realize or facilitate aspects of the wireless communications system 100, the wireless communications system 200, the process flow 300, or the process flow 400, or any combination thereof. For example, the process flow 500 may include example operations associated a network entity 505 and a UE 515, which may be examples of the corresponding devices as described with reference to FIGS. 1 through 4. The operations performed at the network entity 505 or the UE 515, or both, may support improvements to communications between the network entity 505 and the UE 515, among other benefits. In the following description of the process flow 500, the operations performed at the network entity 505 and the UE 515 may occur in a different order than the example order shown. Additionally, the operations performed at the network entity 505 and the UE 515 may be performed in different orders or at different times. Some operations may be combined and some operations may be omitted. In the example of FIG. 5, the network entity 505 and the UE 515 may support a framework for dynamically enabling or disabling the downlink power control parameters.

At 520, the network entity 505 may output a sidelink resource indication indicating one or more sidelink resources allocated to the UE 515 for sidelink communications. In some examples, the sidelink resource indication may be an example of a sidelink resource indication as described with reference to FIGS. 2 through 4. For example, the sidelink resource indication may correspond to control information, such as a dynamic grant (e.g., transmitted via a DCI format 3_0), a Type 1 configured grant (e.g., transmitted via RRC signaling), a Type 2 configured grant (e.g., transmitted via RRC signaling), or control information (e.g., transmitted via a DCI 3_0) activating a Type 2 configured grant.

In some examples, at 525, the network entity 505 may determine that one or more resources allocated (e.g., designated) for uplink communications may be non-overlapping in a time domain with the one or more sidelink resources allocated to the UE 515. That is, the network entity 505 may determine that the sidelink resources allocated to the UE 515 using the sidelink resource indication may be non-overlapping with symbols or slots designated for uplink transmissions. For example, the network entity 505 may determine that the sidelink resources allocated to the UE 515 may be overlapping with symbols or slots designated for downlink transmissions.

At 530, the network entity 505 may output a downlink power control indication that use of the downlink power control parameters in determination of the sidelink transmission power may be disabled at the UE 515 for one or more sidelink communications between the UE 515 and at least another UE (e.g., using the one or more sidelink resources). In some examples, the network entity 505 may transmit the downlink power control indication based on the determination (e.g., at 525) that the sidelink resources allocated to the UE 515 using the sidelink resource indication may be non-overlapping with symbols or slots designated for uplink transmissions. The downlink power control indication may be an example of a downlink power control indication as described with reference to FIGS. 2 through 4. For example, the downlink power control indication may be included in a MAC CE or a DCI message. In some examples, to output the downlink power control indication, the network entity 505 may output a MAC CE that includes a field whose content may be indicative of the downlink power control indication. Alternatively, to output the downlink power control indication, the network entity 505 may output a DCI message that includes one or more bits that correspond to the downlink power control indication.

In some examples, at 535, the network entity 505 may obtain a feedback message in response to outputting the downlink power control indication (e.g., the downlink power control indication output via a MAC CE). The feedback message may be an example of a feedback message as described with reference to FIG. 3. For example, the UE 515 may be configured to disable the use of the downlink power control parameters in the determination of the sidelink transmission power for the sidelink communications subsequent to transmitting the feedback message.

In some examples, at 540, the network entity 505 may allocate additional uplink symbols or additional downlink symbols for network entity-based communications in accordance with the downlink power control indication. For example, the network entity 505 may allocate the additional uplink symbols or the additional downlink symbols for the network entity-based communications, which may occur after a time period (e.g., a minimum time period or an otherwise suitable time period) that may be triggered by receipt of the feedback message. That is, the network entity 505 may schedule uplink transmissions such that uplink symbols (or slots) may be non-overlapping with the one or more sidelink resources. Additionally, the network entity 505 may schedule downlink transmissions such that downlink symbols (or slots) may be overlapping with the one or more sidelink resources. In some examples, scheduling uplink and downlink transmissions (e.g., for one or more other UEs) based on whether use of the downlink power control parameters is enabled or disabled at the UE 515 may increase a reliability of wireless communications at the network entity 505, among other possible benefits.

Figure 6:
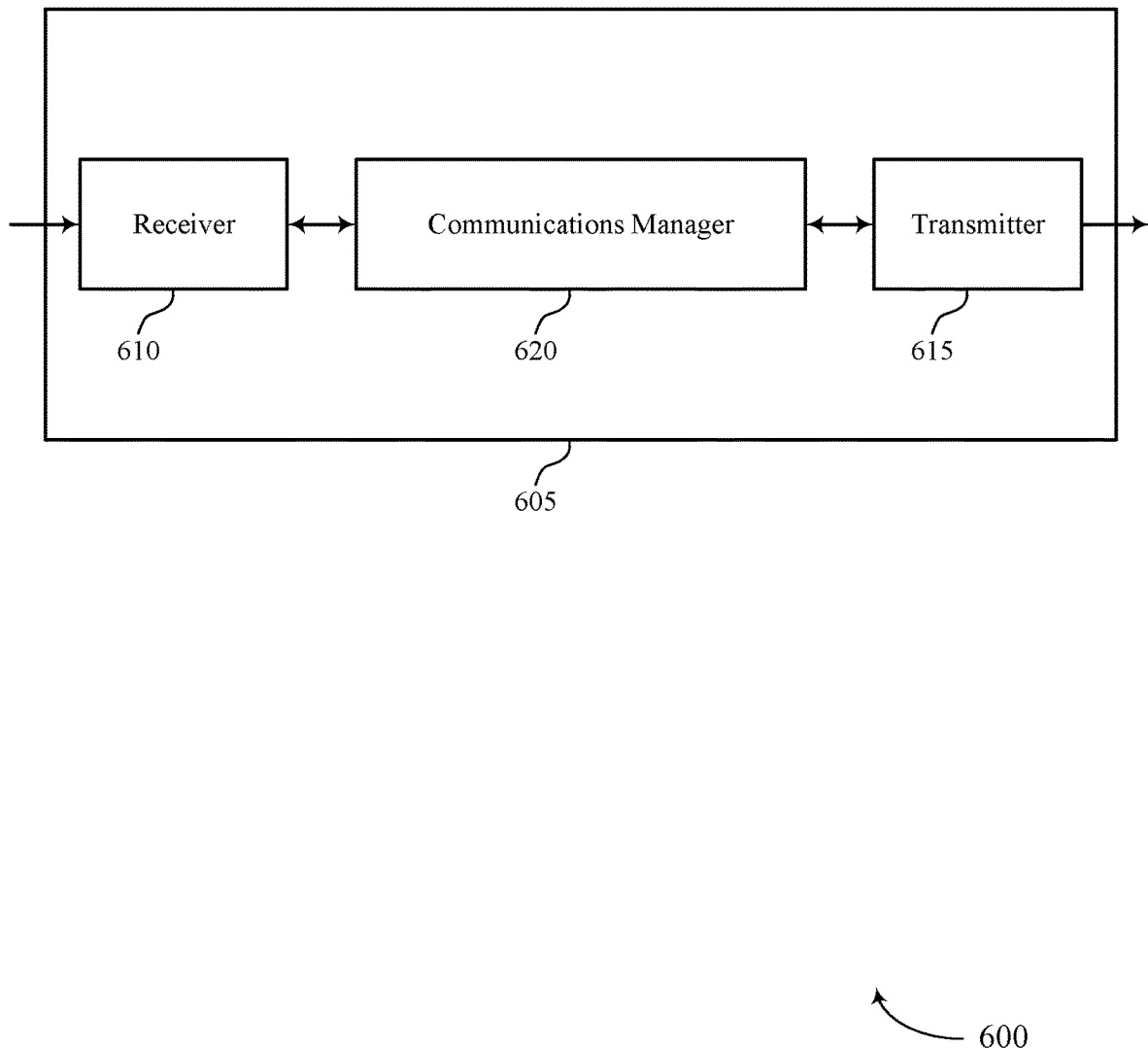
FIGS. 6 and 7 illustrate block diagrams of devices that support dynamic sidelink power control in accordance with one or more aspects of the present disclosure.

FIG. 6 illustrates a block diagram 600 of a device 605 that supports dynamic sidelink power control in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic sidelink power control). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to dynamic sidelink power control). In some examples, the transmitter 615 may be co-located with a receiver 610 in a transceiver component. The transmitter 615 may utilize a single antenna or a set of multiple antennas.

The communications manager 620, the receiver 610, the transmitter 615, or various combinations thereof or various components thereof may be examples of means for performing various aspects of dynamic sidelink power control as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first UE (e.g., the device 605) in accordance with examples as disclosed herein. For example, the communications manager 620 may be configured as or otherwise support a means for receiving, from a network entity, control information indicating one or more sidelink resources allocated to the first UE for sidelink communications. The communications manager 620 may be configured as or otherwise support a means for receiving, from the network entity, an indication that use of downlink power control parameters in determination of a sidelink transmission power for the sidelink communications is to be disabled at the first UE. The communications manager 620 may be configured as or otherwise support a means for transmitting, to a second UE (e.g., another device 605), a sidelink message using at least one sidelink resource of the one or more sidelink resources and with the sidelink transmission power determined at the first UE in accordance with the indication.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources.

Figure 7:
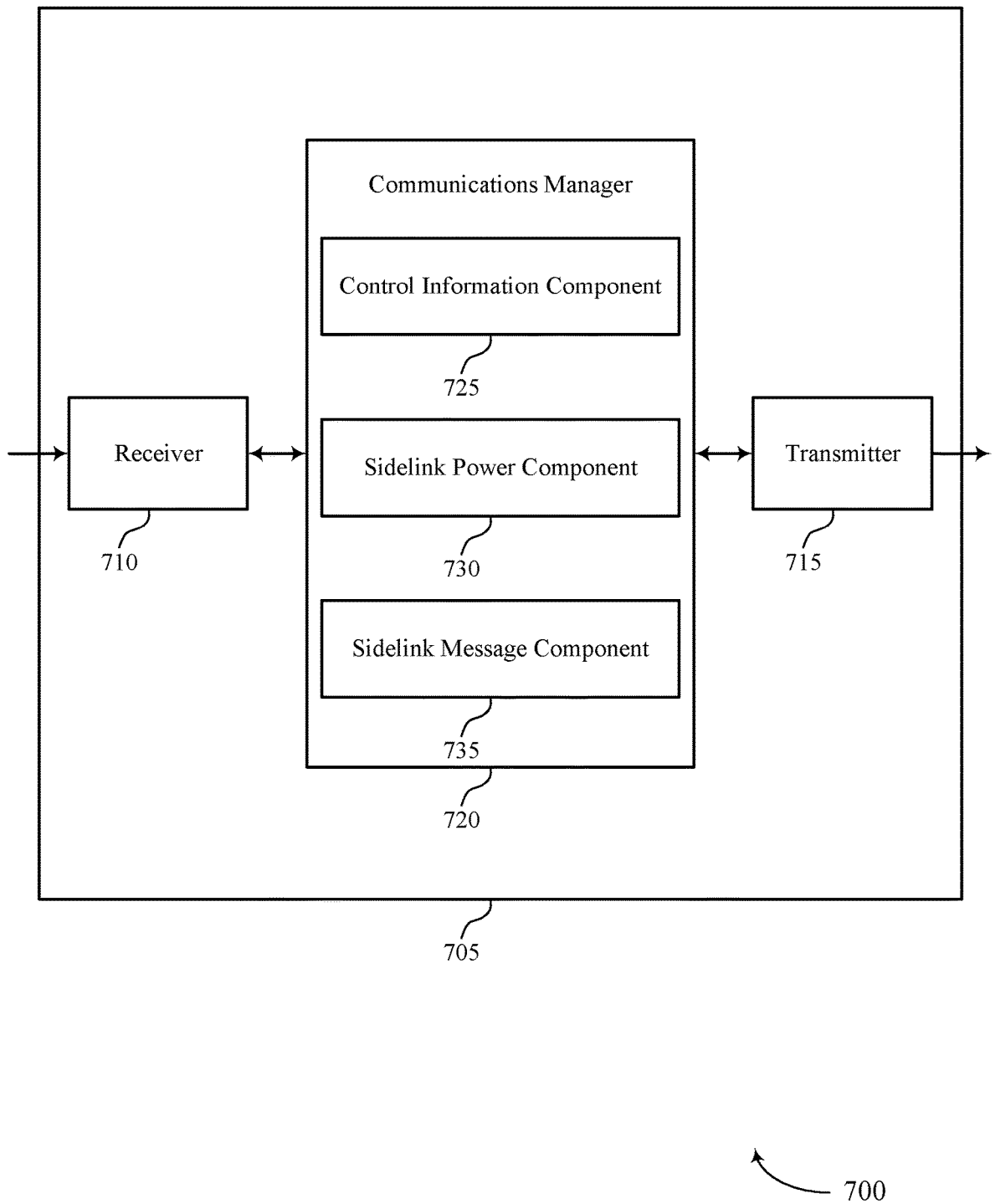

FIG. 7 illustrates a block diagram 700 of a device 705 that supports dynamic sidelink power control in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to dynamic sidelink power control).

Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to dynamic sidelink power control). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of dynamic sidelink power control as described herein. For example, the communications manager 720 may include a control information component 725, a sidelink power component 730, a sidelink message component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first UE (e.g., the device 705) in accordance with examples as disclosed herein. The control information component 725 may be configured as or otherwise support a means for receiving, from a network entity, control information indicating one or more sidelink resources allocated to the first UE for sidelink communications. The sidelink power component 730 may be configured as or otherwise support a means for receiving, from the network entity, an indication that use of downlink power control parameters in determination of a sidelink transmission power for the sidelink communications is to be disabled at the first UE. The sidelink message component 735 may be configured as or otherwise support a means for transmitting, to a second UE (e.g., another device 705), a sidelink message using at least one sidelink resource of the one or more sidelink resources and with the sidelink transmission power determined at the first UE in accordance with the indication.

Figure 8:
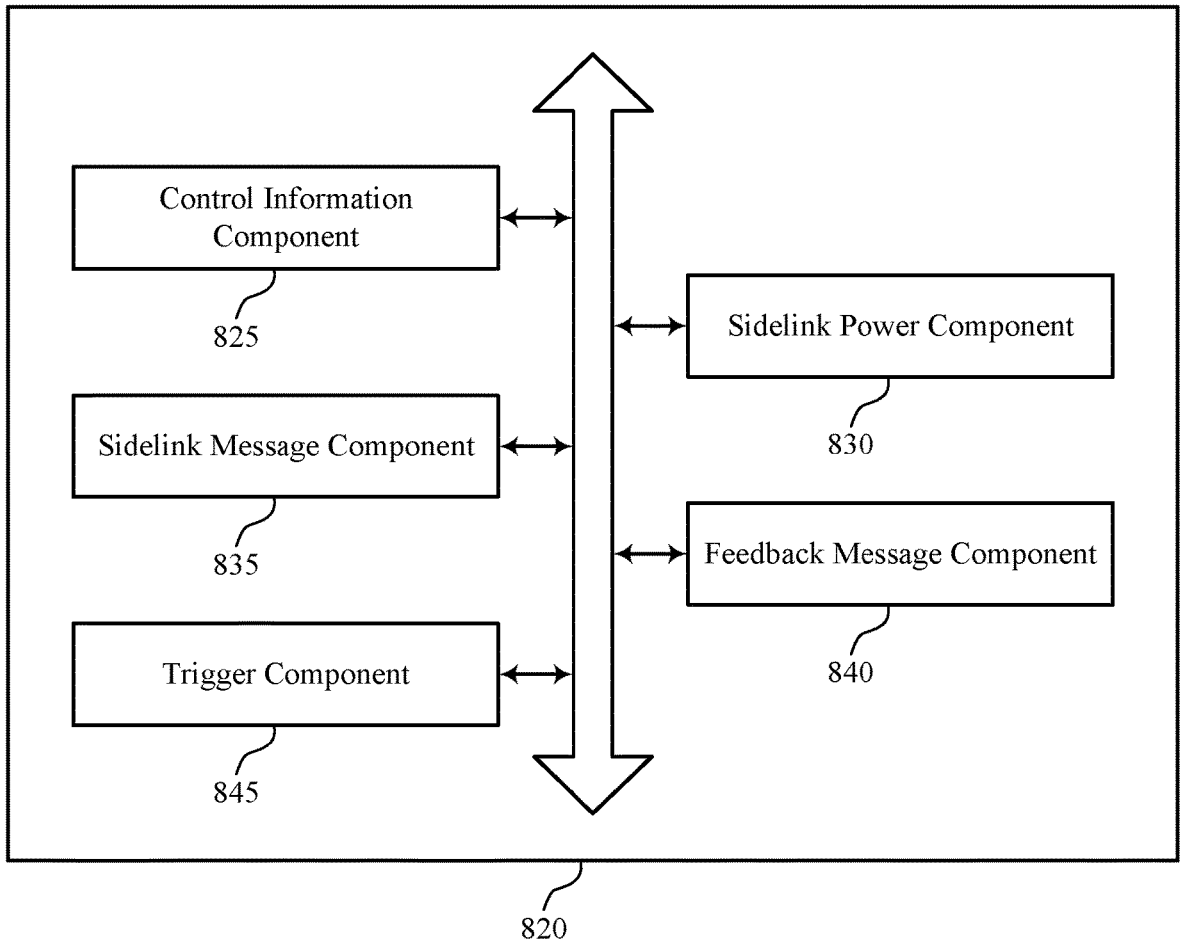
FIG. 8 illustrates a block diagram of a communications manager that supports dynamic sidelink power control in accordance with one or more aspects of the present disclosure.

FIG. 8 illustrates a block diagram 800 of a communications manager 820 that supports dynamic sidelink power control in accordance with one or more aspects of the present disclosure. The communications manager 820 may be an example of aspects of a communications manager 620, a communications manager 720, or both, as described herein. The communications manager 820, or various components thereof, may be an example of means for performing various aspects of dynamic sidelink power control as described herein. For example, the communications manager 820 may include a control information component 825, a sidelink power component 830, a sidelink message component 835, a feedback message component 840, a trigger component 845, or any combination thereof. Each of these components may communicate, directly or indirectly, with one another (e.g., via one or more buses).

The communications manager 820 may support wireless communication at a first UE in accordance with examples as disclosed herein. The control information component 825 may be configured as or otherwise support a means for receiving, from a network entity, control information indicating one or more sidelink resources allocated to the first UE for sidelink communications. The sidelink power component 830 may be configured as or otherwise support a means for receiving, from the network entity, an indication that use of downlink power control parameters in determination of a sidelink transmission power for the sidelink communications is to be disabled at the first UE. The sidelink message component 835 may be configured as or otherwise support a means for transmitting, to a second UE, a sidelink message using at least one sidelink resource of the one or more sidelink resources and with the sidelink transmission power determined at the first UE in accordance with the indication.

In some examples, to support receiving the indication, the sidelink power component 830 may be configured as or otherwise support a means for receiving a MAC CE that includes a field whose content is indicative of the indication. In some examples, the field is a destination index field. In some examples, a destination index included as the content of the field is indicative that one or more sidelink communications from the first UE are to be transmitted without the downlink power control parameters being used in the determination of the sidelink transmission power.

In some examples, the field is a destination index field. In some examples, a destination index included as the content of the field is indicative that all sidelink communications from the first UE within a duration of time are to be transmitted without the downlink power control parameters being used in the determination of the sidelink transmission power.

In some examples, the field is a destination index field. In some examples, the content of the field includes an absence of a destination index, the absence being indicative that all sidelink communications from the first UE within a duration of time are to be transmitted without the downlink power control parameters being used in the determination of the sidelink transmission power.

In some examples, the feedback message component 840 may be configured as or otherwise support a means for transmitting, to the network entity, a feedback message in response to receiving the indication. In some examples, the trigger component 845 may be configured as or otherwise support a means for disabling the use of the downlink power control parameters in the determination of the sidelink transmission power for the sidelink communications, where the disabling occurs after a minimum time period that is triggered by the transmitting of the feedback message. In some examples, transmission of the sidelink message occurs during a symbol designated for downlink transmissions. In some examples, the designation was triggered, at least in part, by the feedback message.

In some examples, the sidelink power component 830 may be configured as or otherwise support a means for receiving, from the network entity, a second indication that use of the downlink power control parameters in the determination of the sidelink transmission power for the sidelink communications is to be enabled at the first UE, where application by the first UE of the first indication continues until application, by the first UE, of the second indication.

In some examples, to support receiving the indication, the sidelink power component 830 may be configured as or otherwise support a means for receiving, in a DCI message, one or more bits, where each bit of the one or more bits corresponds to a respective sidelink resource of the one or more sidelink resources and indicates that use of the downlink power control parameters in the determination of the sidelink transmission power for a sidelink communication using the respective sidelink resource is to be disabled at the first UE.

In some examples, to support receiving the indication, the sidelink power component 830 may be configured as or otherwise support a means for receiving, in a DCI message, a bit that indicates that use of the downlink power control parameters in the determination of the sidelink transmission power for the sidelink communications using any of the one or more sidelink resources is to be disabled at the first UE. In some examples, the downlink power control parameters include at least one of a PDSCH transmission power, a downlink pathloss parameter, or a corresponding pathloss compensation coefficient.

Figure 9:
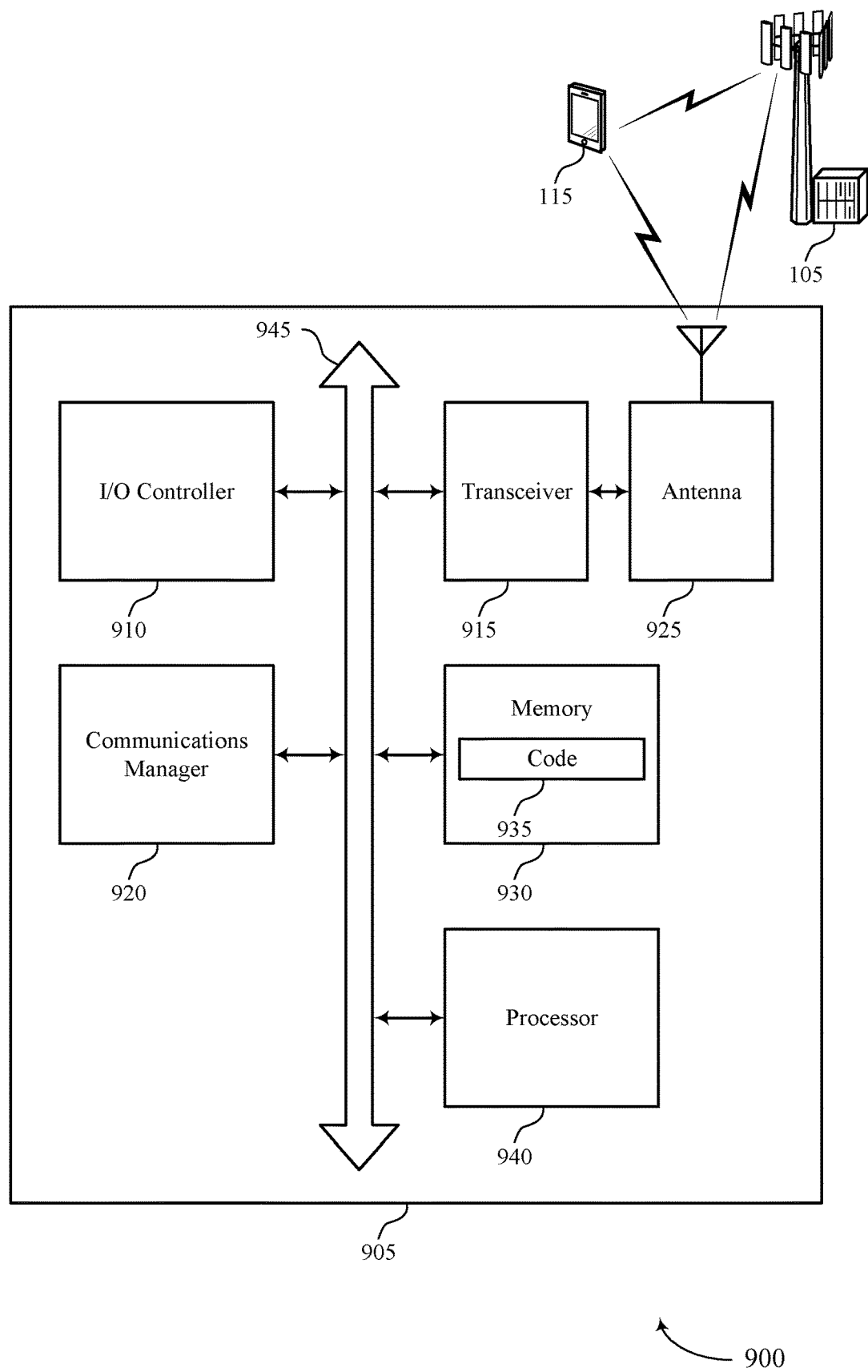
FIG. 9 illustrates a diagram of a system including a device that supports dynamic sidelink power control in accordance with one or more aspects of the present disclosure.

FIG. 9 illustrates a diagram of a system 900 including a device 905 that supports dynamic sidelink power control in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting dynamic sidelink power control). For example, the device 905 or a component of the device 905 may include a processor 940 and memory 930 coupled with or to the processor 940, the processor 940 and memory 930 configured to perform various functions described herein.

The communications manager 920 may support wireless communication at a first UE (e.g., the device 905) in accordance with examples as disclosed herein. For example, the communications manager 920 may be configured as or otherwise support a means for receiving, from a network entity, control information indicating one or more sidelink resources allocated to the first UE for sidelink communications. The communications manager 920 may be configured as or otherwise support a means for receiving, from the network entity, an indication that use of downlink power control parameters in determination of a sidelink transmission power for the sidelink communications is to be disabled at the first UE. The communications manager 920 may be configured as or otherwise support a means for transmitting, to a second UE (e.g., another device 905), a sidelink message using at least one sidelink resource of the one or more sidelink resources and with the sidelink transmission power determined at the first UE in accordance with the indication.

By including or configuring the communications manager 920 in accordance with examples as described herein, the device 905 may support techniques for improved communication reliability, reduced latency, and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of dynamic sidelink power control as described herein, or the processor 940 and the memory 930 may be otherwise configured to perform or support such operations.

Figure 10:
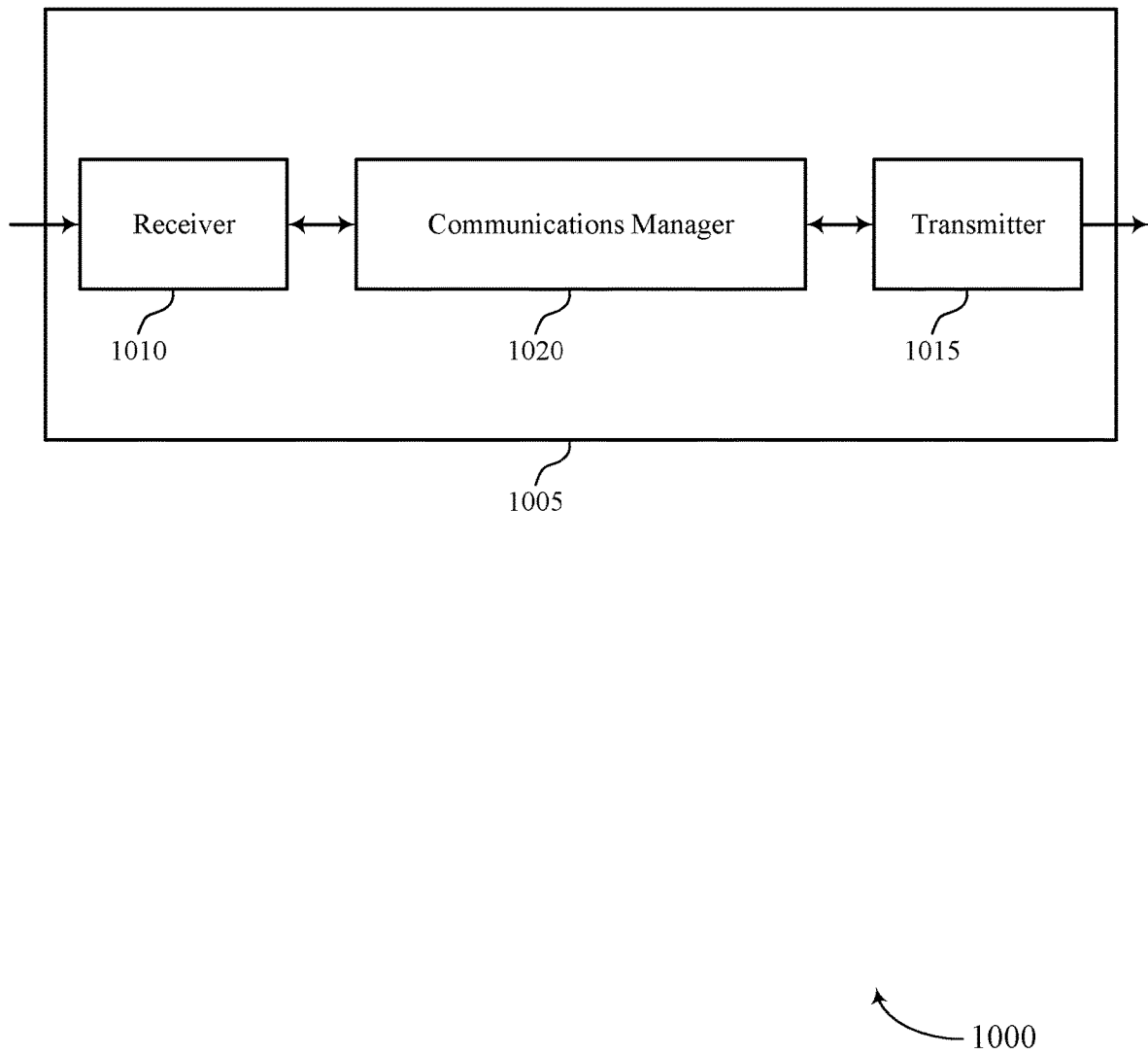
FIGS. 10 and 11 illustrate block diagrams of devices that support dynamic sidelink power control in accordance with one or more aspects of the present disclosure.

FIG. 10 illustrates a block diagram 1000 of a device 1005 that supports dynamic sidelink power control in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of dynamic sidelink power control as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity (e.g., the device 1005) in accordance with examples as disclosed herein. For example, the communications manager 1020 may be configured as or otherwise support a means for outputting control information indicating one or more sidelink resources allocated to a first UE for sidelink communications. The communications manager 1020 may be configured as or otherwise support a means for outputting an indication that use of downlink power control parameters in determination of a sidelink transmission power is to be disabled at the first UE for one or more sidelink communication between the first UE and at least a second UE.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources.

Figure 11:
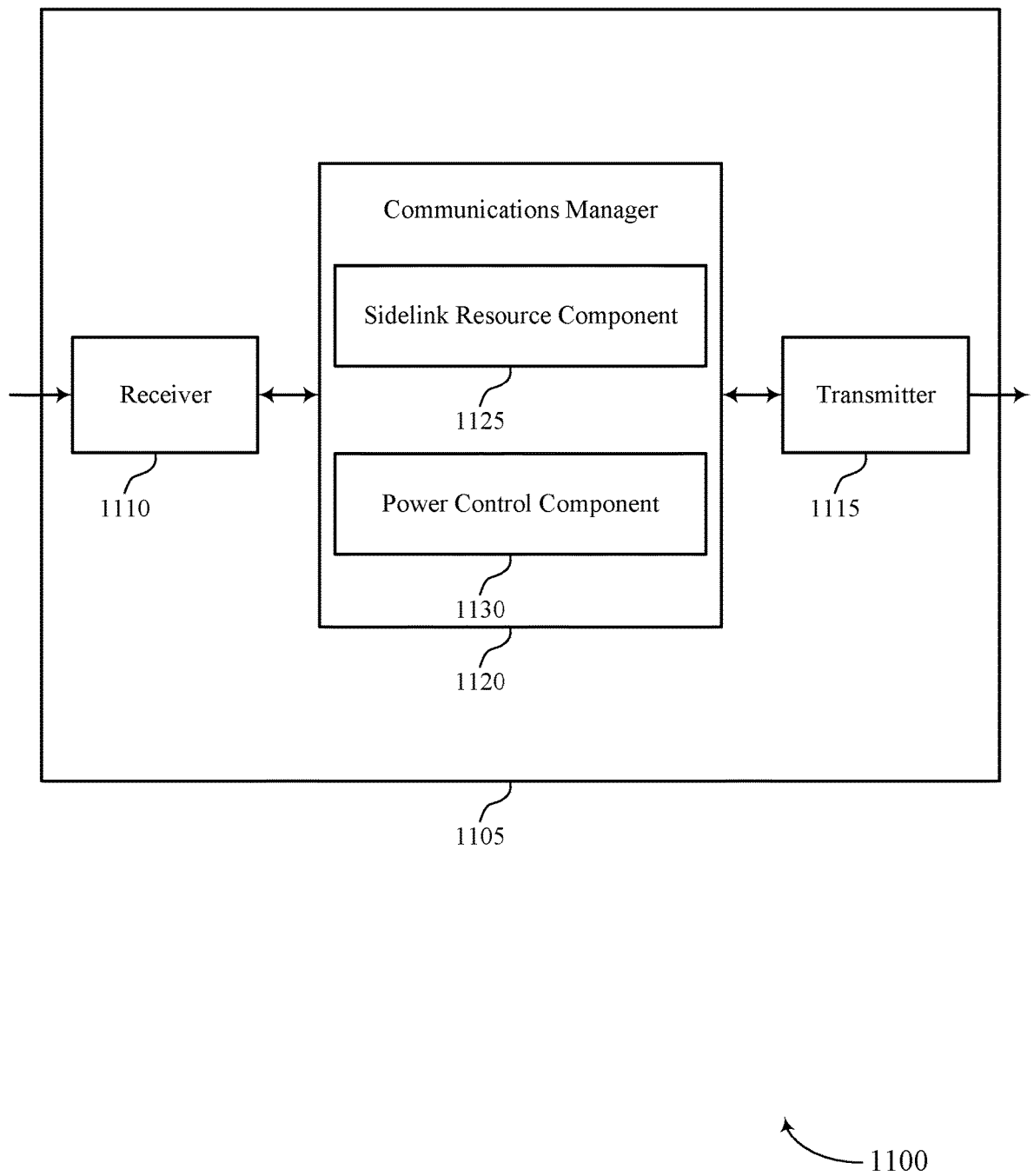

FIG. 11 illustrates a block diagram 1100 of a device 1105 that supports dynamic sidelink power control in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of dynamic sidelink power control as described herein. For example, the communications manager 1120 may include a sidelink resource component 1125 a power control component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity (e.g., the device 1105) in accordance with examples as disclosed herein. The sidelink resource component 1125 may be configured as or otherwise support a means for outputting control information indicating one or more sidelink resources allocated to a first UE for sidelink communications. The power control component 1130 may be configured as or otherwise support a means for outputting an indication that use of downlink power control parameters in determination of a sidelink transmission power is to be disabled at the first UE for one or more sidelink communication between the first UE and at least a second UE.

Figure 12:
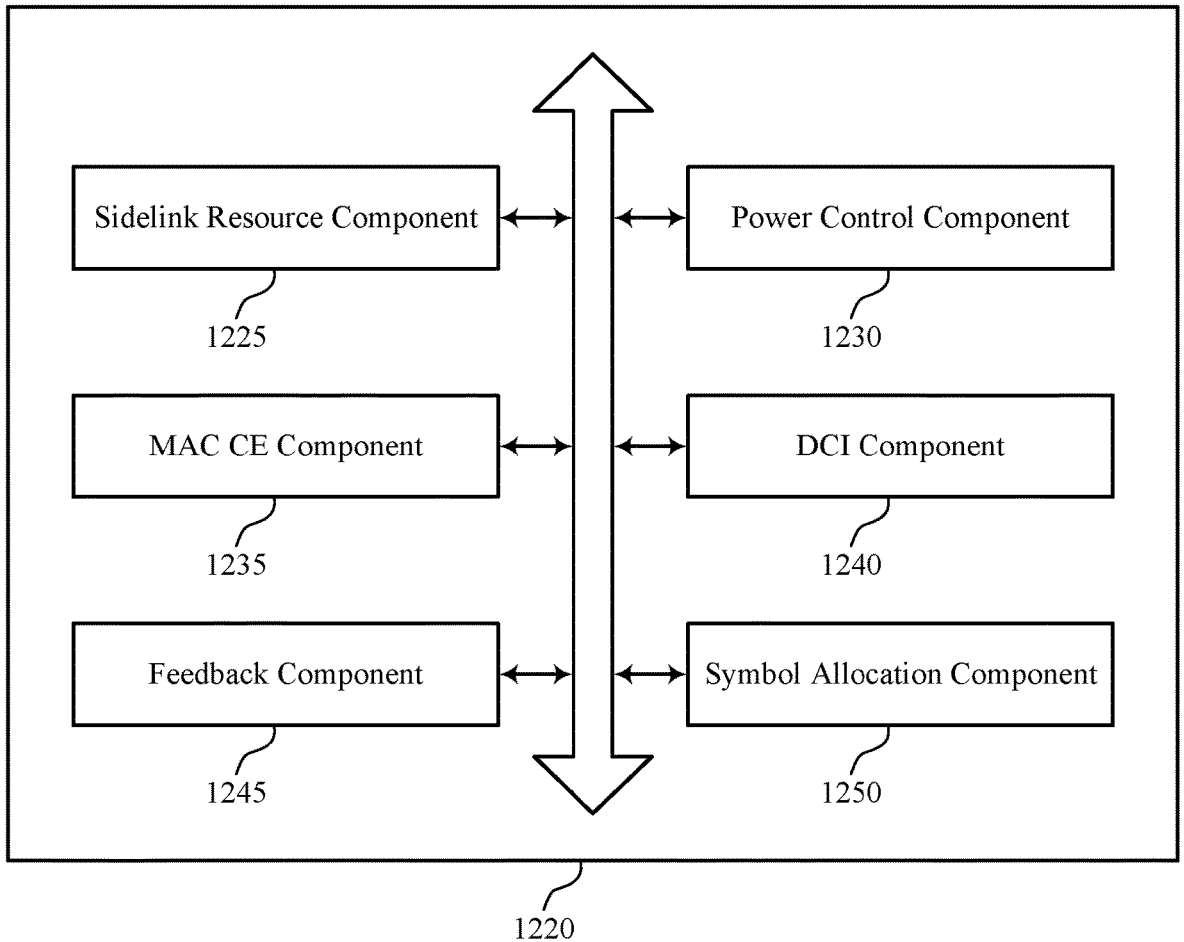
FIG. 12 illustrates a block diagram of a communications manager that supports dynamic sidelink power control in accordance with one or more aspects of the present disclosure.

FIG. 12 illustrates a block diagram 1200 of a communications manager 1220 that supports dynamic sidelink power control in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of dynamic sidelink power control as described herein. For example, the communications manager 1220 may include a sidelink resource component 1225, a power control component 1230, a MAC CE component 1235, a DCI component 1240, a feedback component 1245, a symbol allocation component 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The sidelink resource component 1225 may be configured as or otherwise support a means for outputting control information indicating one or more sidelink resources allocated to a first UE for sidelink communications. The power control component 1230 may be configured as or otherwise support a means for outputting an indication that use of downlink power control parameters in determination of a sidelink transmission power is to be disabled at the first UE for one or more sidelink communication between the first UE and at least a second UE.

In some examples, to support outputting the indication, the MAC CE component 1235 may be configured as or otherwise support a means for outputting a MAC CE that includes a field whose content is indicative of the indication. In some examples, the field is a destination index field. In some examples, a destination index included as the content of the field is indicative that one or more sidelink communications from the first UE are to be transmitted without the downlink power control parameters being used in the determination of the sidelink transmission power.

In some examples, the field is a destination index field. In some examples, a destination index included as the content of the field is indicative that all sidelink communications from the first UE within a duration of time are to be transmitted without the downlink power control parameters being used in the determination of the sidelink transmission power.

In some examples, the field is a destination index field. In some examples, the content of the field includes an absence of a destination index, the absence being indicative that all sidelink communications from the first UE within a duration of time are to be transmitted without the downlink power control parameters being used in the determination of the sidelink transmission power.

In some examples, the feedback component 1245 may be configured as or otherwise support a means for obtaining a feedback message in response to outputting the indication. In some examples, the symbol allocation component 1250 may be configured as or otherwise support a means for allocating additional uplink symbols or additional downlink symbols for network entity-based communications in accordance with the indication, the network entity-based communications to occur after a minimum time period that is triggered by receipt of the feedback message.

In some examples, to support allocating the additional uplink symbols or additional downlink symbols, the symbol allocation component 1250 may be configured as or otherwise support a means for allocating the additional downlink symbols so as to overlap with the one or more sidelink communication between the first UE and at least the second UE.

In some examples, to support outputting the indication, the DCI component 1240 may be configured as or otherwise support a means for outputting, in a DCI message, one or more bits, where each bit of the one or more bits corresponds to a respective sidelink resource of the one or more sidelink resources and indicates that use of the downlink power control parameters in the determination of the sidelink transmission power for a sidelink communication using the respective sidelink resource is to be disabled at the first UE.

In some examples, to support outputting the indication, the DCI component 1240 may be configured as or otherwise support a means for outputting, in a DCI message, a bit that indicates that use of the downlink power control parameters in the determination of the sidelink transmission power for the sidelink communications using any of the one or more sidelink resources is to be disabled at the first UE.

In some examples, the sidelink resource component 1225 may be configured as or otherwise support a means for determining that one or more resources allocated to the first UE for uplink communications are non-overlapping in a time domain with the one or more sidelink resources, where outputting the indication that use of the downlink power control parameters in determination of the sidelink transmission power is to be disabled at the first UE is based on the determination. In some examples, the downlink power control parameters include at least one of a PDSCH transmission power, a downlink pathloss parameter, or a corresponding pathloss compensation coefficient.

Figure 13:
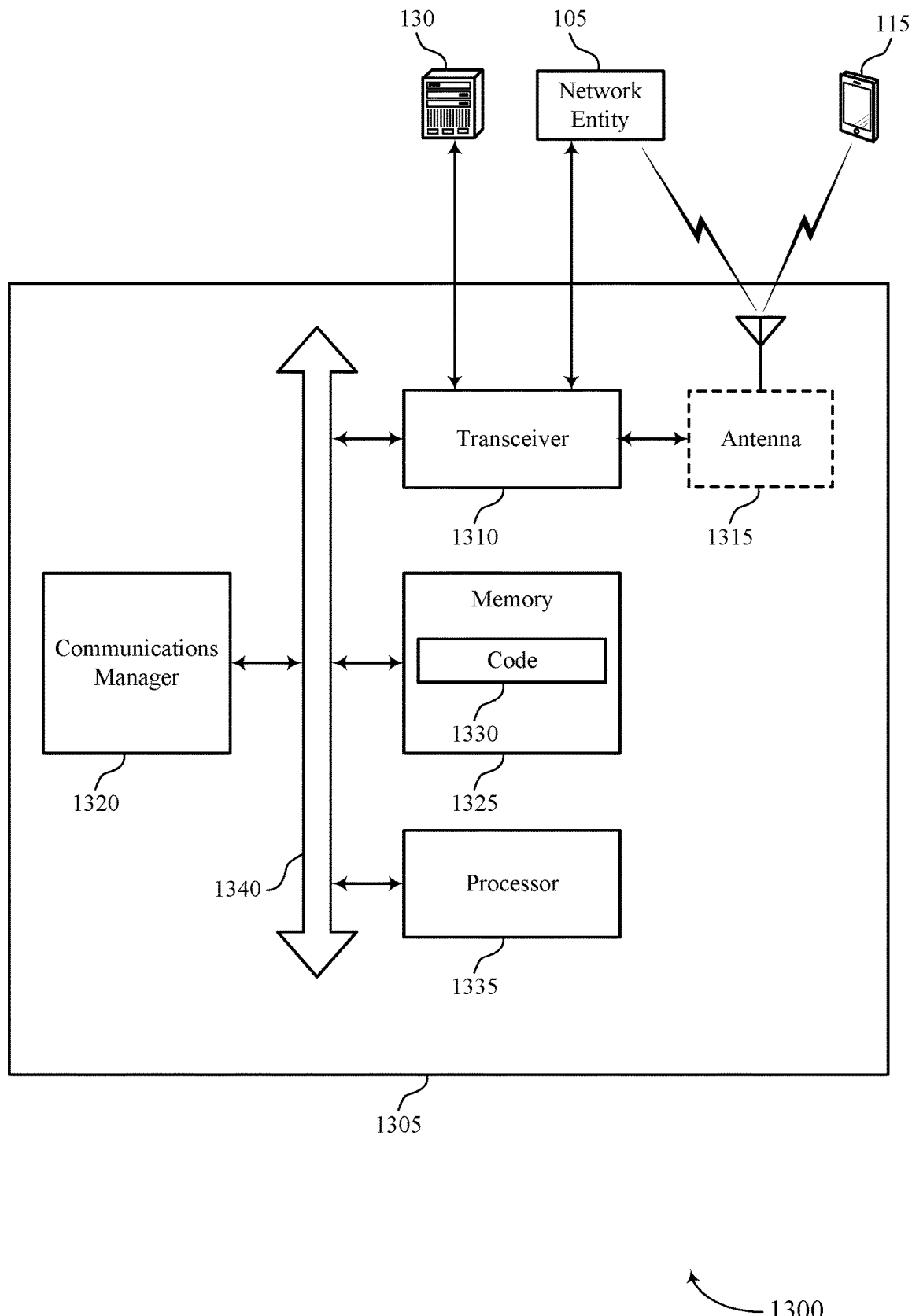
FIG. 13 illustrates a diagram of a system including a device that supports dynamic sidelink power control in accordance with one or more aspects of the present disclosure.

FIG. 13 illustrates a diagram of a system 1300 including a device 1305 that supports dynamic sidelink power control in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting dynamic sidelink power control). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity (e.g., the device 1305) in accordance with examples as disclosed herein. For example, the communications manager 1320 may be configured as or otherwise support a means for outputting control information indicating one or more sidelink resources allocated to a first UE for sidelink communications. The communications manager 1320 may be configured as or otherwise support a means for outputting an indication that use of downlink power control parameters in determination of a sidelink transmission power is to be disabled at the first UE for one or more sidelink communication between the first UE and at least a second UE.

By including or configuring the communications manager 1320 in accordance with examples as described herein, the device 1305 may support techniques for improved communication reliability, reduced latency, and more efficient utilization of communication resources.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of dynamic sidelink power control as described herein, or the processor 1335 and the memory 1325 may be otherwise configured to perform or support such operations.

Figure 14:
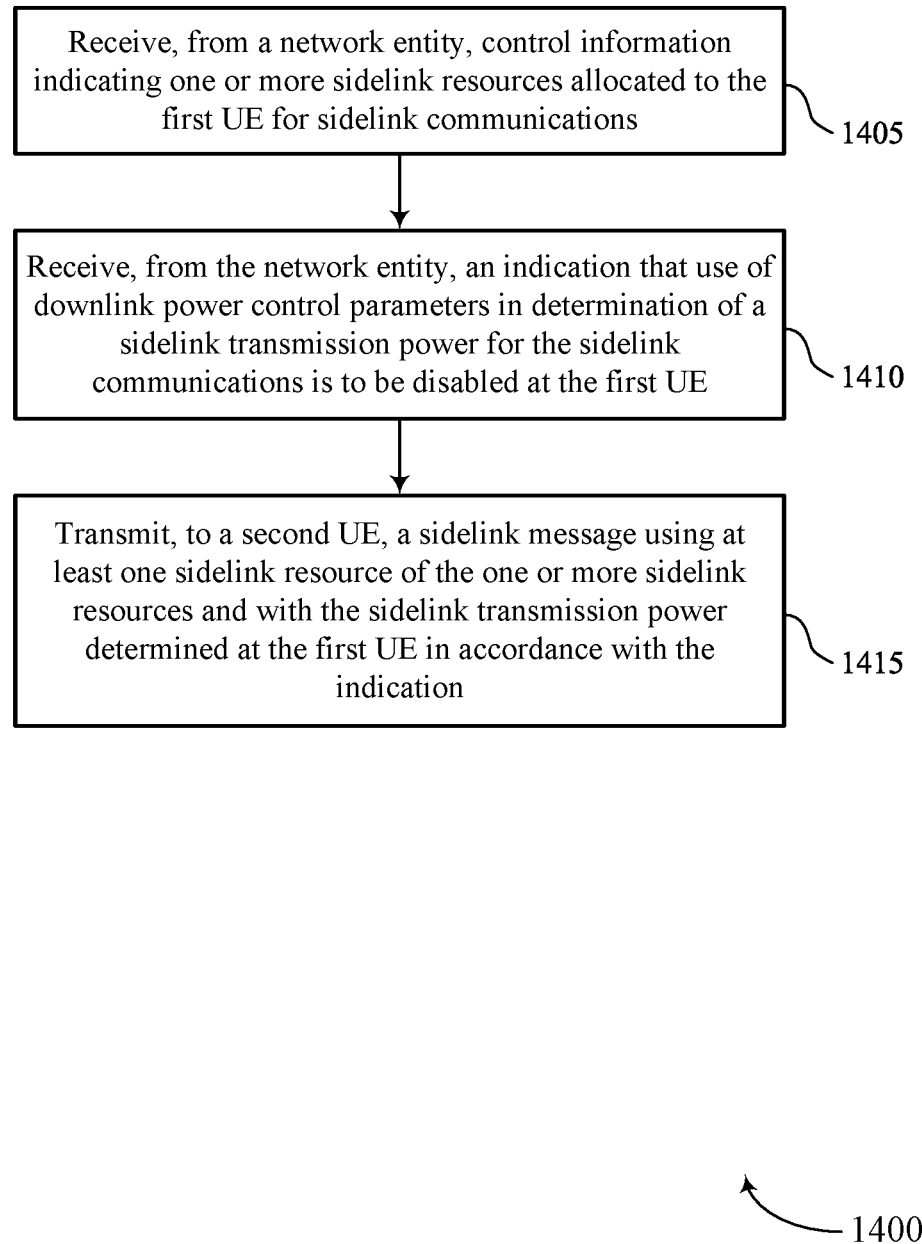
FIGS. 14 through 17 illustrate flowcharts showing methods that support dynamic sidelink power control in accordance with one or more aspects of the present disclosure.

FIG. 14 illustrates a flowchart illustrating a method 1400 that supports dynamic sidelink power control in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, control information indicating one or more sidelink resources allocated to the first UE for sidelink communications. The operations of 1405 may be performed in accordance with examples as disclosed herein. In some examples, aspects of the operations of 1405 may be performed by a control information component 825 as described with reference to FIG. 8.

At 1410, the method may include receiving, from the network entity, an indication that use of downlink power control parameters in determination of a sidelink transmission power for the sidelink communications is to be disabled at the first UE. The operations of 1410 may be performed in accordance with examples as disclosed herein. In some examples, aspects of the operations of 1410 may be performed by a sidelink power component 830 as described with reference to FIG. 8.

At 1415, the method may include transmitting, to a second UE, a sidelink message using at least one sidelink resource of the one or more sidelink resources and with the sidelink transmission power determined at the first UE in accordance with the indication. The operations of 1415 may be performed in accordance with examples as disclosed herein. In some examples, aspects of the operations of 1415 may be performed by a sidelink message component 835 as described with reference to FIG. 8.

Figure 15:
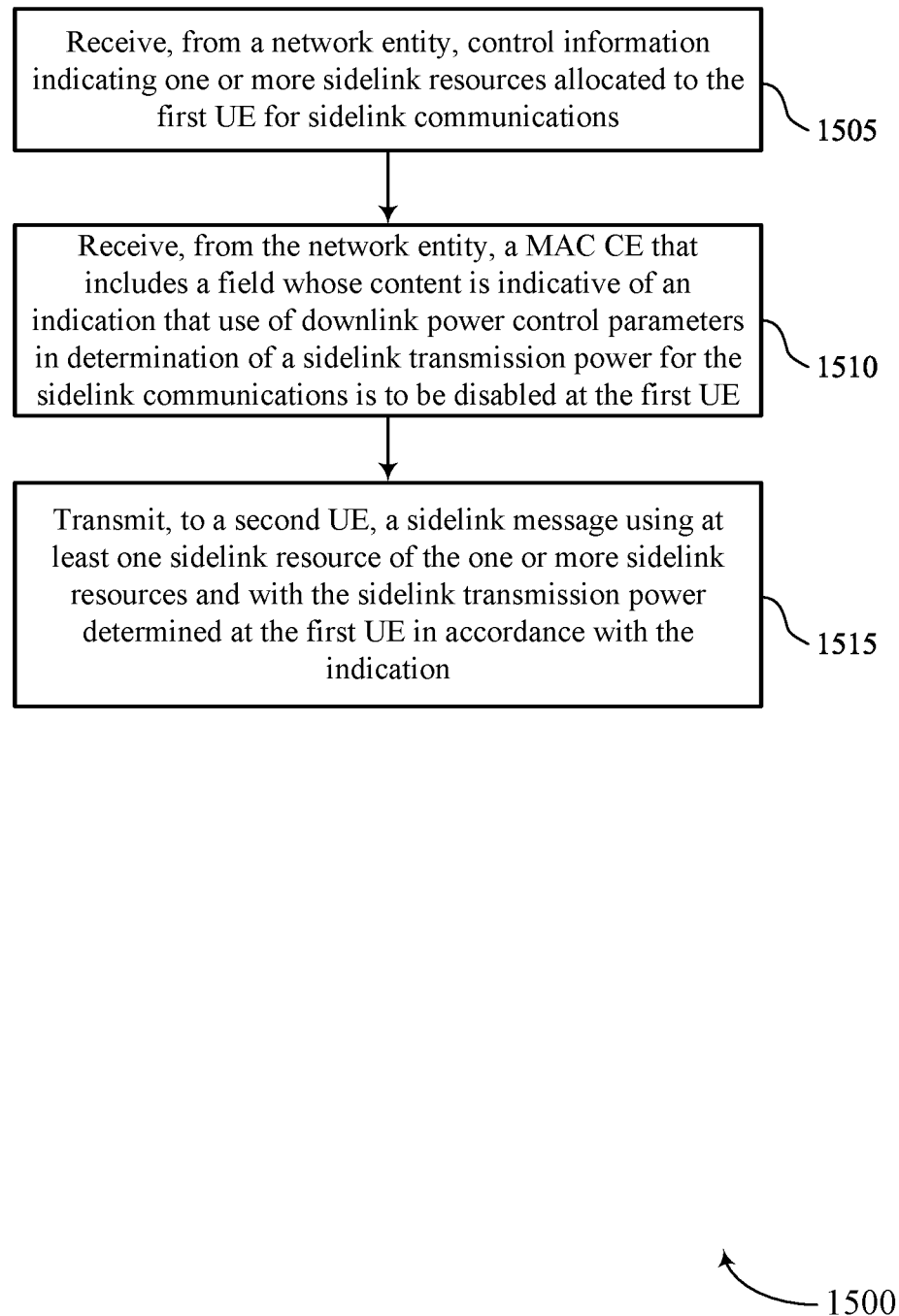

FIG. 15 illustrates a flowchart illustrating a method 1500 that supports dynamic sidelink power control in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, control information indicating one or more sidelink resources allocated to the first UE for sidelink communications. The operations of 1505 may be performed in accordance with examples as disclosed herein. In some examples, aspects of the operations of 1505 may be performed by a control information component 825 as described with reference to FIG. 8.

At 1510, the method may include receiving, from the network entity, a MAC CE that includes a field whose content is indicative of an indication that use of downlink power control parameters in determination of a sidelink transmission power for the sidelink communications is to be disabled at the first UE. The operations of 1510 may be performed in accordance with examples as disclosed herein. In some examples, aspects of the operations of 1510 may be performed by a sidelink power component 830 as described with reference to FIG. 8.

At 1515, the method may include transmitting, to a second UE, a sidelink message using at least one sidelink resource of the one or more sidelink resources and with the sidelink transmission power determined at the first UE in accordance with the indication. The operations of 1515 may be performed in accordance with examples as disclosed herein. In some examples, aspects of the operations of 1515 may be performed by a sidelink message component 835 as described with reference to FIG. 8.

Figure 16:
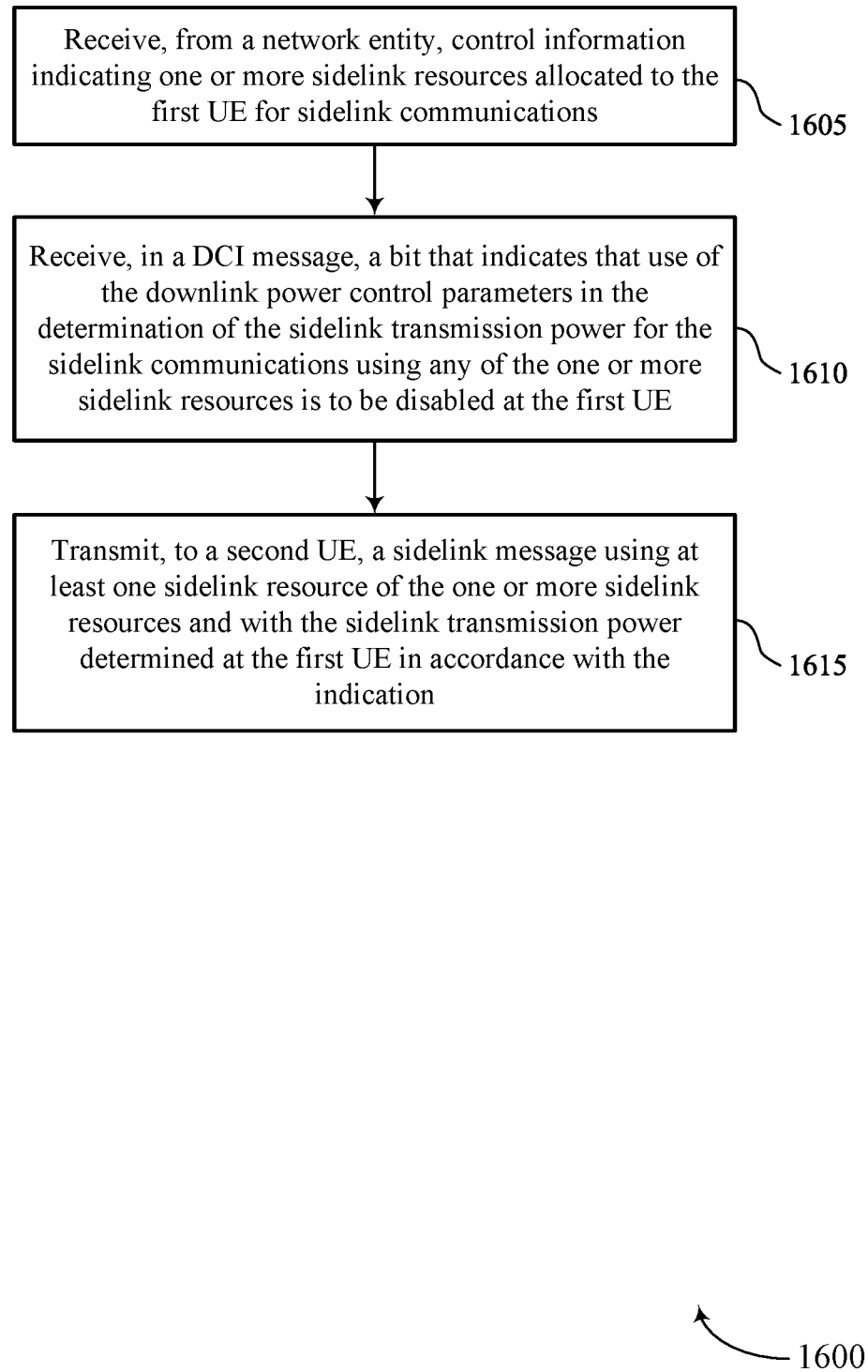

FIG. 16 illustrates a flowchart illustrating a method 1600 that supports dynamic sidelink power control in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity, control information indicating one or more sidelink resources allocated to the first UE for sidelink communications. The operations of 1605 may be performed in accordance with examples as disclosed herein. In some examples, aspects of the operations of 1605 may be performed by a control information component 825 as described with reference to FIG. 8.

At 1610, the method may include receiving, in a DCI message, a bit that indicates that use of the downlink power control parameters in the determination of the sidelink transmission power for the sidelink communications using any of the one or more sidelink resources is to be disabled at the first UE. The operations of 1610 may be performed in accordance with examples as disclosed herein. In some examples, aspects of the operations of 1610 may be performed by a sidelink power component 830 as described with reference to FIG. 8.

At 1615, the method may include transmitting, to a second UE, a sidelink message using at least one sidelink resource of the one or more sidelink resources and with the sidelink transmission power determined at the first UE in accordance with the indication. The operations of 1615 may be performed in accordance with examples as disclosed herein. In some examples, aspects of the operations of 1615 may be performed by a sidelink message component 835 as described with reference to FIG. 8.

Figure 17:
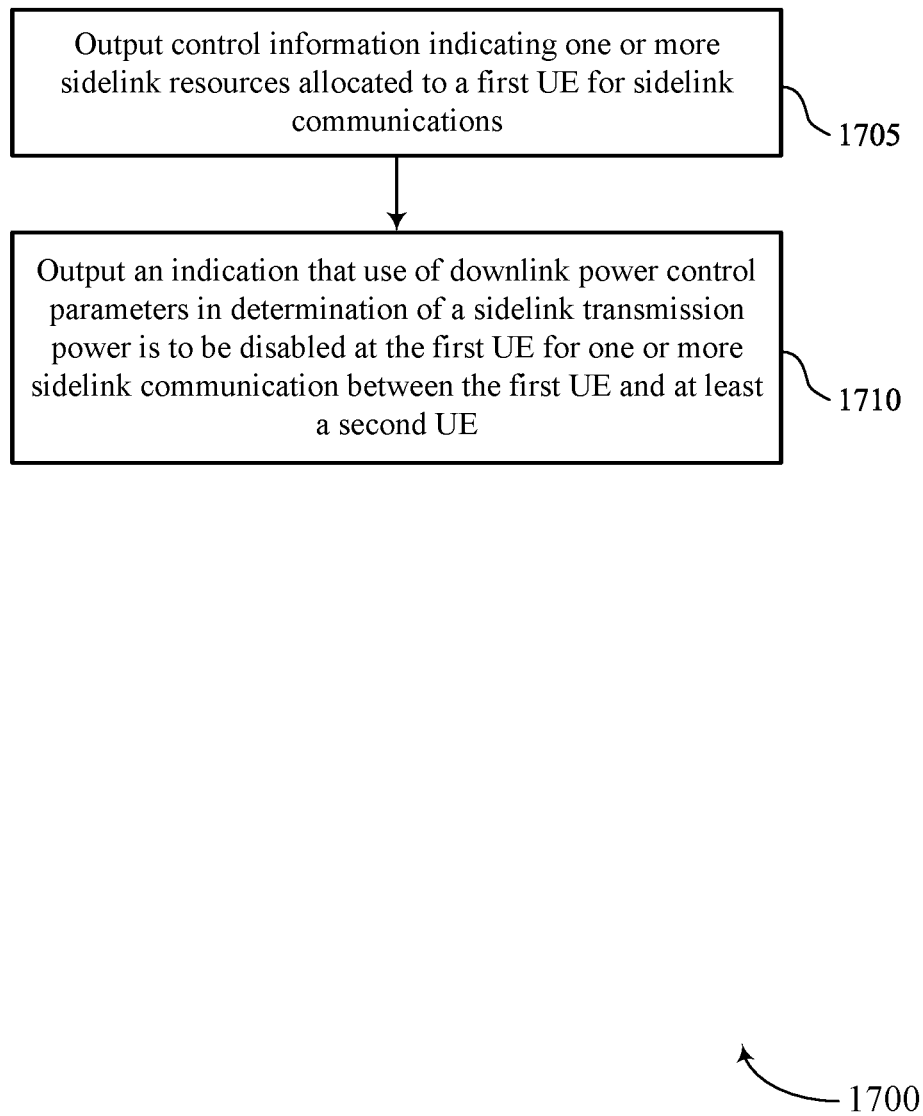

FIG. 17 illustrates a flowchart illustrating a method 1700 that supports dynamic sidelink power control in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include outputting control information indicating one or more sidelink resources allocated to a first UE for sidelink communications. The operations of 1705 may be performed in accordance with examples as disclosed herein. In some examples, aspects of the operations of 1705 may be performed by a sidelink resource component 1225 as described with reference to FIG. 12.

At 1710, the method may include outputting an indication that use of downlink power control parameters in determination of a sidelink transmission power is to be disabled at the first UE for one or more sidelink communication between the first UE and at least a second UE. The operations of 1710 may be performed in accordance with examples as disclosed herein. In some examples, aspects of the operations of 1710 may be performed by a power control component 1230 as described with reference to FIG. 12.

The following provides an overview of aspects of the present disclosure:

Aspect 1: A method for wireless communication at a first UE, comprising: receiving, from a network entity, control information indicating one or more sidelink resources allocated to the first UE for sidelink communications; receiving, from the network entity, an indication that use of downlink power control parameters in determination of a sidelink transmission power for the sidelink communications is to be disabled at the first UE; and transmitting, to a second UE, a sidelink message using at least one sidelink resource of the one or more sidelink resources and with the sidelink transmission power determined at the first UE in accordance with the indication.

Aspect 2: The method of aspect 1, wherein receiving the indication comprises: receiving a MAC CE that includes a field whose content is indicative of the indication.

Aspect 3: The method of aspect 2, wherein the field is a destination index field, and a destination index included as the content of the field is indicative that one or more sidelink communications from the first UE are to be transmitted without the downlink power control parameters being used in the determination of the sidelink transmission power.

Aspect 4: The method of aspect 2, wherein the field is a destination index field, and a destination index included as the content of the field is indicative that all sidelink communications from the first UE within a duration of time are to be transmitted without the downlink power control parameters being used in the determination of the sidelink transmission power.

Aspect 5: The method of aspect 2, wherein the field is a destination index field, and the content of the field includes an absence of a destination index, the absence being indicative that all sidelink communications from the first UE within a duration of time are to be transmitted without the downlink power control parameters being used in the determination of the sidelink transmission power.

Aspect 6: The method of any of aspects 2 through 5, further comprising: transmitting, to the network entity, a feedback message in response to receiving the indication; and disabling the use of the downlink power control parameters in the determination of the sidelink transmission power for the sidelink communications, wherein the disabling occurs after a minimum time period that is triggered by the transmitting of the feedback message.

Aspect 7: The method of aspect 6, wherein transmission of the sidelink message occurs during a symbol designated for downlink transmissions, the designation was triggered, at least in part, by the feedback message.

Aspect 8: The method of any of aspects 2 through 7, further comprising: receiving, from the network entity, a second indication that use of the downlink power control parameters in the determination of the sidelink transmission power for the sidelink communications is to be enabled at the first UE, wherein application by the first UE of the first indication continues until application, by the first UE, of the second indication.

Aspect 9: The method of aspect 1, wherein receiving the indication comprises: receiving, in a DCI message, one or more bits, wherein each bit of the one or more bits corresponds to a respective sidelink resource of the one or more sidelink resources and indicates that use of the downlink power control parameters in the determination of the sidelink transmission power for a sidelink communication using the respective sidelink resource is to be disabled at the first UE.

Aspect 10: The method of aspect 1, wherein receiving the indication comprises: receiving, in a DCI message, a bit that indicates that use of the downlink power control parameters in the determination of the sidelink transmission power for the sidelink communications using any of the one or more sidelink resources is to be disabled at the first UE.

Aspect 11: The method of any of aspects 1 through 10, wherein the downlink power control parameters comprise at least one of a PDSCH transmission power, a downlink pathloss parameter, or a corresponding pathloss compensation coefficient.

Aspect 12: A method for wireless communication at a network entity, comprising: outputting control information indicating one or more sidelink resources allocated to a first UE for sidelink communications; and outputting an indication that use of downlink power control parameters in determination of a sidelink transmission power is to be disabled at the first UE for one or more sidelink communication between the first UE and at least a second UE.

Aspect 13: The method of aspect 12, wherein outputting the indication comprises: outputting a MAC CE that includes a field whose content is indicative of the indication.

Aspect 14: The method of aspect 13, wherein the field is a destination index field, and a destination index included as the content of the field is indicative that one or more sidelink communications from the first UE are to be transmitted without the downlink power control parameters being used in the determination of the sidelink transmission power.

Aspect 15: The method of aspect 13, wherein the field is a destination index field, and a destination index included as the content of the field is indicative that all sidelink communications from the first UE within a duration of time are to be transmitted without the downlink power control parameters being used in the determination of the sidelink transmission power.

Aspect 16: The method of aspect 13, wherein the field is a destination index field, and the content of the field includes an absence of a destination index, the absence being indicative that all sidelink communications from the first UE within a duration of time are to be transmitted without the downlink power control parameters being used in the determination of the sidelink transmission power.

Aspect 17: The method of any of aspects 13 through 16, further comprising: obtaining a feedback message in response to outputting the indication; and allocating additional uplink symbols or additional downlink symbols for network entity-based communications in accordance with the indication, the network entity-based communications to occur after a minimum time period that is triggered by receipt of the feedback message.

Aspect 18: The method of aspect 17, wherein allocating the additional uplink symbols or additional downlink symbols comprises: allocating the additional downlink symbols so as to overlap with the one or more sidelink communication between the first UE and at least the second UE.

Aspect 19: The method of aspect 12, wherein outputting the indication comprises: outputting, in a DCI message, one or more bits, wherein each bit of the one or more bits corresponds to a respective sidelink resource of the one or more sidelink resources and indicates that use of the downlink power control parameters in the determination of the sidelink transmission power for a sidelink communication using the respective sidelink resource is to be disabled at the first UE.

Aspect 20: The method of aspect 12, wherein outputting the indication comprises: outputting, in a DCI message, a bit that indicates that use of the downlink power control parameters in the determination of the sidelink transmission power for the sidelink communications using any of the one or more sidelink resources is to be disabled at the first UE.

Aspect 21: The method of any of aspects 12 through 20, further comprising: determining that one or more resources allocated to the first UE for uplink communications are non-overlapping in a time domain with the one or more sidelink resources, wherein outputting the indication that use of the downlink power control parameters in determination of the sidelink transmission power is to be disabled at the first UE is based at least in part on the determination.

Aspect 22: The method of any of aspects 12 through 21, wherein the downlink power control parameters comprise at least one of a PDSCH transmission power, a downlink pathloss parameter, or a corresponding pathloss compensation coefficient.

Aspect 23: An apparatus for wireless communication at a first UE, comprising a processor; memory coupled with the processor; and instructions stored in the memory and executable by the processor to cause the apparatus to perform a method of any of aspects 1 through 11.

Aspect 24: An apparatus for wireless communication at a first UE, comprising at least one means for performing a method of any of aspects 1 through 11.

Aspect 25: A non-transitory computer-readable medium storing code for wireless communication at a first UE, the code comprising instructions executable by a processor to perform a method of any of aspects 1 through 11.

Aspect 26: An apparatus for wireless communication at a network entity, comprising a processor; memory coupled with the processor; and instructions stored in the memory and executable by the processor to cause the apparatus to perform a method of any of aspects 12 through 22.

Aspect 27: An apparatus for wireless communication at a network entity, comprising at least one means for performing a method of any of aspects 12 through 22.

Aspect 28: A non-transitory computer-readable medium storing code for wireless communication at a network entity, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:

receiving, from a network entity, control information indicating one or more sidelink resources allocated to the first UE for sidelink communications;

receiving, from the network entity, an indication that use of downlink power control parameters in determination of a sidelink transmission power for the sidelink communications is to be disabled at the first UE; and transmitting, to a second UE, a sidelink message using at least one sidelink resource of the one or more sidelink resources and with the sidelink transmission power determined at the first UE in accordance with the indication.

2. The method of claim 1, wherein receiving the indication comprises:

receiving a medium access control (MAC) control entity (CE) that includes a field whose content is indicative of the indication.

3. The method of claim 2, wherein the field is a destination index field, and a destination index included as the content of the field is indicative that one or more sidelink communications from the first UE are to be transmitted without the downlink power control parameters being used in the determination of the sidelink transmission power.

4. The method of claim 2, wherein the field is a destination index field, and a destination index included as the content of the field is indicative that all sidelink communications from the first UE within a duration of time are to be transmitted without the downlink power control parameters being used in the determination of the sidelink transmission power.

5. The method of claim 2, wherein the field is a destination index field, and the content of the field includes an absence of a destination index, the absence being indicative that all sidelink communications from the first UE within a duration of time are to be transmitted without the downlink power control parameters being used in the determination of the sidelink transmission power.

6. The method of claim 2, further comprising:

transmitting, to the network entity, a feedback message in response to receiving the indication; and disabling the use of the downlink power control parameters in the determination of the sidelink transmission power for the sidelink communications, wherein the disabling occurs after a minimum time period that is triggered by the transmitting of the feedback message.

7. The method of claim 6, wherein transmission of the sidelink message occurs during a symbol designated for downlink transmissions, the designation was triggered, at least in part, by the feedback message.

8. The method of claim 2, further comprising:

receiving, from the network entity, a second indication that use of the downlink power control parameters in the determination of the sidelink transmission power for the sidelink communications is to be enabled at the first UE, wherein application by the first UE of the first indication continues until application, by the first UE, of the second indication.

9. The method of claim 1, wherein receiving the indication comprises:

receiving, in a downlink control information message, one or more bits, wherein each bit of the one or more bits corresponds to a respective sidelink resource of the one or more sidelink resources and indicates that use of the downlink power control parameters in the determination of the sidelink transmission power for a sidelink communication using the respective sidelink resource is to be disabled at the first UE.

10. The method of claim 1, wherein receiving the indication comprises:

receiving, in a downlink control information message, a bit that indicates that use of the downlink power control parameters in the determination of the sidelink transmission power for the sidelink communications using any of the one or more sidelink resources is to be disabled at the first UE.

11. The method of claim 1, wherein the downlink power control parameters comprise at least one of a physical downlink shared channel transmission power, a downlink pathloss parameter, or a corresponding pathloss compensation coefficient.

12. A method for wireless communication at a network entity, comprising:

outputting control information indicating one or more sidelink resources allocated to a first user equipment (UE) for sidelink communications; and outputting an indication that use of downlink power control parameters in determination of a sidelink transmission power is to be disabled at the first UE for one or more sidelink communication between the first UE and at least a second UE.

13. The method of claim 12, wherein outputting the indication comprises:

outputting a medium access control (MAC) control entity (CE) that includes a field whose content is indicative of the indication.

14. The method of claim 13, wherein the field is a destination index field, and a destination index included as the content of the field is indicative that one or more sidelink communications from the first UE are to be transmitted without the downlink power control parameters being used in the determination of the sidelink transmission power.

15. The method of claim 13, wherein the field is a destination index field, and a destination index included as the content of the field is indicative that all sidelink communications from the first UE within a duration of time are to be transmitted without the downlink power control parameters being used in the determination of the sidelink transmission power.

16. The method of claim 13, wherein the field is a destination index field, and the content of the field includes an absence of a destination index, the absence being indicative that all sidelink communications from the first UE within a duration of time are to be transmitted without the downlink power control parameters being used in the determination of the sidelink transmission power.

17. The method of claim 13, further comprising:

obtaining a feedback message in response to outputting the indication; and allocating additional uplink symbols or additional downlink symbols for network entity-based communications in accordance with the indication, the network entity-based communications to occur after a minimum time period that is triggered by receipt of the feedback message.

18. The method of claim 17, wherein allocating the additional uplink symbols or additional downlink symbols comprises:

allocating the additional downlink symbols so as to overlap with the one or more sidelink communication between the first UE and at least the second UE.

19. The method of claim 12, wherein outputting the indication comprises:

outputting, in a downlink control information message, one or more bits, wherein each bit of the one or more bits corresponds to a respective sidelink resource of the one or more sidelink resources and indicates that use of the downlink power control parameters in the determination of the sidelink transmission power for a sidelink communication using the respective sidelink resource is to be disabled at the first UE.

20. The method of claim 12, wherein outputting the indication comprises:
outputting, in a downlink control information message, a bit that indicates that use of the downlink power control parameters in the determination of the sidelink transmission power for the sidelink communications using any of the one or more sidelink resources is to be disabled at the first UE.

21. The method of claim 12, further comprising:
determining that one or more resources allocated to the first UE for uplink communications are non-overlapping in a time domain with the one or more sidelink resources, wherein outputting the indication that use of the downlink power control parameters in determination of the sidelink transmission power is to be disabled at the first UE is based at least in part on the determination.

22. The method of claim 12, wherein the downlink power control parameters comprise at least one of a physical downlink shared channel transmission power, a downlink pathloss parameter, or a corresponding pathloss compensation coefficient.

23. An apparatus for wireless communication at a first user equipment (UE), comprising:
a processor;
memory coupled with the processor; and
instructions stored in the memory and executable by the processor to cause the apparatus to:
receive, from a network entity, control information indicating one or more sidelink resources allocated to the first UE for sidelink communications;
receive, from the network entity, an indication that use of downlink power control parameters in determination of a sidelink transmission power for the sidelink communications is to be disabled at the first UE; and
transmit, to a second UE, a sidelink message using at least one sidelink resource of the one or more sidelink resources and with the sidelink transmission power determined at the first UE in accordance with the indication.

24. The apparatus of claim 23, wherein the instructions to receive the indication are executable by the processor to cause the apparatus to:
receive a medium access control (MAC) control entity (CE) that includes a field whose content is indicative of the indication.

25. The apparatus of claim 23, wherein the instructions to receive the indication are executable by the processor to cause the apparatus to:
receive, in a downlink control information message, one or more bits, wherein each bit of the one or more bits corresponds to a respective sidelink resource of the one or more sidelink resources and indicates that use of the downlink power control parameters in the determination of the sidelink transmission power for a sidelink communication using the respective sidelink resource is to be disabled at the first UE.

26. The apparatus of claim 23, wherein the instructions to receive the indication are executable by the processor to cause the apparatus to:
receive, in a downlink control information message, a bit that indicates that use of the downlink power control parameters in the determination of the sidelink transmission power for the sidelink communications using any of the one or more sidelink resources is to be disabled at the first UE.

27. An apparatus for wireless communication at a network entity, comprising:
a processor;
memory coupled with the processor; and
instructions stored in the memory and executable by the processor to cause the apparatus to:
output control information indicating one or more sidelink resources allocated to a first user equipment (UE) for sidelink communications; and
output an indication that use of downlink power control parameters in determination of a sidelink transmission power is to be disabled at the first UE for one or more sidelink communication between the first UE and at least a second UE.

28. The apparatus of claim 27, wherein the instructions to output the indication are executable by the processor to cause the apparatus to:
output a medium access control (MAC) control entity (CE) that includes a field whose content is indicative of the indication.

29. The apparatus of claim 27, wherein the instructions to output the indication are executable by the processor to cause the apparatus to:
output, in a downlink control information message, one or more bits, wherein each bit of the one or more bits corresponds to a respective sidelink resource of the one or more sidelink resources and indicates that use of the downlink power control parameters in the determination of the sidelink transmission power for a sidelink communication using the respective sidelink resource is to be disabled at the first UE.

30. The apparatus of claim 27, wherein the instructions to output the indication are executable by the processor to cause the apparatus to:
output, in a downlink control information message, a bit that indicate that use of the downlink power control parameters in the determination of the sidelink transmission power for the sidelink communications using any of the one or more sidelink resources is to be disabled at the first UE.

* * * * *